US012777345B2

(12) United States Patent
Kolan

(10) Patent No.: US 12,777,345 B2
(45) Date of Patent: Oct. 27, 2026

(54) NETWORK SLICE REPLACEMENT FOR MULTIMEDIA SERVICES

(71) Applicant: Samsung Electronics Co., Ltd., Suwon-si (KR)

(72) Inventor: Prakash Reddy Kolan, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 18/776,115

(22) Filed: Jul. 17, 2024

(65) Prior Publication Data

US 2025/0039694 A1 Jan. 30, 2025

Related U.S. Application Data

(60) Provisional application No. 63/544,561, filed on Oct. 17, 2023, provisional application No. 63/543,997, filed on Oct. 13, 2023, provisional application No. 63/529,294, filed on Jul. 27, 2023.

(51) Int. Cl.
*H04W 24/02* (2009.01)
*H04L 41/0816* (2022.01)
*H04L 41/0893* (2022.01)
*H04W 28/24* (2009.01)

(52) U.S. Cl.
CPC ......... *H04W 24/02* (2013.01); *H04L 41/0816* (2013.01); *H04L 41/0893* (2013.01); *H04W 28/24* (2013.01)

(58) Field of Classification Search
None
See application file for complete search history.

(56) References Cited

U.S. PATENT DOCUMENTS

2021/0160763 A1 5/2021 Lou et al.
2022/0278906 A1 9/2022 Akman et al.
2023/0094999 A1* 3/2023 Prakasam ............ H04W 60/00 455/435.1
2023/0130966 A1 4/2023 Suh et al.
(Continued)

FOREIGN PATENT DOCUMENTS

CN 112514344 A 3/2021
CN 112970228 A 6/2021

OTHER PUBLICATIONS

International Search Report and Written Opinion issued Nov. 4, 2024 regarding International Application No. PCT/KR2024/010916, 8 pages.
(Continued)

*Primary Examiner* — Angela Nguyen

(57) ABSTRACT

A method includes configuring a first network slice with a first configuration and configuring first actions to avoid network slice replacement. The method also includes receiving an indication for the network slice replacement of the first network slice with a second network slice. The method further includes instructing to perform the first actions to avoid the network slice replacement. In addition, the method includes when the first actions performed to avoid the network slice replacement are unsuccessful, moving application flows from the first network slice to the second network slice with a second configuration, the first configuration is different from the second configuration. The method also includes monitoring a service with the second network slice.

20 Claims, 24 Drawing Sheets

(56) References Cited

U.S. PATENT DOCUMENTS

2023/0308855 A1* 9/2023 Matolia ................. H04W 36/06
2025/0048213 A1* 2/2025 Pateromichelakis ........................ H04L 41/0806

OTHER PUBLICATIONS

"3rd Generation Partnership Project; Technical Specification Group Services and System Aspects; Study on enhancement of network slicing; Phase 3 (Release 18)", 3GPP TR 23.700-41 V18.0.0, Dec. 2022, 167 pages.
"3rd Generation Partnership Project; Technical Specification Group Services and System Aspects; Network Slicing Extensions for 5G media services; (Release 18)", 3GPP TR 26.941 V0.5.0, Apr. 2023, 21 pages.
"3rd Generation Partnership Project; Technical Specification Group Services and System Aspects; System architecture for the 5G System (5GS); Stage 2 (Release 19)," 3GPP TS 23.501 V19.0.0, Jun. 2024, 722 pages.
"3rd Generation Partnership Project; Technical Specification Group Services and System Aspects; 5G Media Streaming (5GMS); Protocols (Release 18)," 3GPP TS 26.512 V18.1.0, Mar. 2024, 212 pages.
"3rd Generation Partnership Project; Technical Specification Group Services and System Aspects; Network Slicing Extensions for the 5G media services (Release 18)," 3GPP TR 26.941 V18.1.0, Mar. 2024, 37 pages.
"3rd Generation Partnership Project; Technical Specification Group Services and System Aspects; Procedures for the 5G System (5GS); Stage 2 (Release 19)," 3GPP TS 23.502 V19.0.0, Jun. 2024, 932 pages.
"3rd Generation Partnership Project; Technical Specification Group Core Network and Terminals; 5G System; Policy Authorization Service; Stage 3 (Release 18)," 3GPP TS 29.514 V18.6.0, Jun. 2024, 265 pages.
"3rd Generation Partnership Project; Technical Specification Group Services and System Aspects; Policy and charging control framework for the 5G System (5GS); Stage 2 (Release 19)," 3GPP TS 23.503 V19.0.0, Jun. 2024, 183 pages.
"3rd Generation Partnership Project; Technical Specification Group Services and System Aspects; 5G Media Streaming (5GMS); General description and architecture (Release 18)," 3GPP TS 26.501 V18.5.0, Mar. 2024, 210 pages.
"3rd Generation Partnership Project; Technical Specification Group Services and System Aspects; Management and orchestration; Study on enhancement of Management Data Analytics (MDA) (Release 17)," 3GPP TR 28.809 V17.0.0, Mar. 2021, 95 pages.
"3rd Generation Partnership Project; Technical Specification Group Services and System Aspects; Study on supporting tactile and multi-modality communication services; Stage 1 (Release 18)," 3GPP TR 22.847 V18.2.0, Mar. 2022, 35 pages.
GSM Association, "Generic Network Slice Template," Version 7.0, Jun. 17, 2022, retrieved from https://www.gsma.com/newsroom/wp-content/uploads/NG.116-v7.0.pdf, 71 pages.
"3rd Generation Partnership Project; Technical Specification Group Core Network and Terminals; 5G System. Common Data Types for Service Based Interfaces; Stage 3 (Release 18)," 3GPP TS 29.571 V18.6.0, Jun. 2024, 246 pages.
Supplementary European Search Report dated Jul. 24, 2026, in connection with European Patent Application No. 24846082.6, 14 pages.
Huawei et al., "Clarification on Alterative S-NSSAI related Policy control," S2-2407072, 3GPP TSG-WG SA2 Meeting #163, Jeju, Korea, May 27-31, 2024, 24 pages.
3rd Generation Partnership Project; Technical Specification Group Services and System Aspects; Procedures for the 5G System (5GS); Stage 2 (Release 18), 3GPP TS 23.502 V18.6.0 (Jun. 2024), 930 pages.

* cited by examiner

NETWORK SLICE REPLACEMENT FOR MULTIMEDIA SERVICES

CROSS-REFERENCE TO RELATED APPLICATION AND PRIORITY CLAIM

This application claims priority under 35 U.S.C. § 119 (e) to U.S. Provisional Patent Application No. 63/529,294 filed on Jul. 27, 2023, U.S. Provisional Patent Application No. 63/543,997 filed on Oct. 13, 2023, and U.S. Provisional Patent Application No. 63/544,561 filed on Oct. 17, 2023, which are hereby incorporated by reference in its entirety.

TECHNICAL FIELD

This disclosure relates generally to multimedia devices and processes. More specifically, this disclosure relates to network slice replacement for multimedia services.

BACKGROUND

Network slicing is a promising technology in 5G networks. Using network slicing, multiple logical networks can be provisioned using the same networking hardware. Each logical network can be independently provisioned, configured, and managed for processes such as QoS, security, etc., there by setting up one or more network slices. Each network slice may provide a different level of QoS or isolation capabilities to the end customer. Network slicing brings in a lot of advantages for the network operator as well as a service provider. But since the technology involves creating and maintaining a number of software systems, these systems are prone to error and reliability issues due to network slices being managed end-to-end and sometimes have to be replaced with new network slices. Without proper network slice replacement practices, the applications setup to use those network slices suffer tremendously.

SUMMARY

This disclosure provides for network slice replacement for multimedia services.

In one embodiment, a method includes configuring a first network slice with a first configuration and configuring first actions to avoid network slice replacement. The method also includes receiving an indication for the network slice replacement of the first network slice with a second network slice. The method further includes instructing to perform the first actions to avoid the network slice replacement. In addition, the method includes when the first actions performed to avoid the network slice replacement are unsuccessful, moving application flows from the first network slice to the second network slice with a second configuration, the first configuration is different from the second configuration. The method also includes monitoring a service with the second network slice.

In another embodiment, an application function includes a transceiver and a processor. The processor is configured to receive a configuration of a first network slice with a first configuration and receive a configuration of first actions to avoid network slice replacement. The processor is also configured to receive an indication for the network slice replacement of the first network slice with a second network slice. The processor is further configured to instruct to perform the first actions to avoid the network slice replacement. In addition, the processor is configured to, when the first actions performed to avoid the network slice replacement are unsuccessful, move application flows from the first network slice to the second network slice with a second configuration, the first configuration is different from the second configuration. The processor is also configured to monitor a service with the second network slice.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
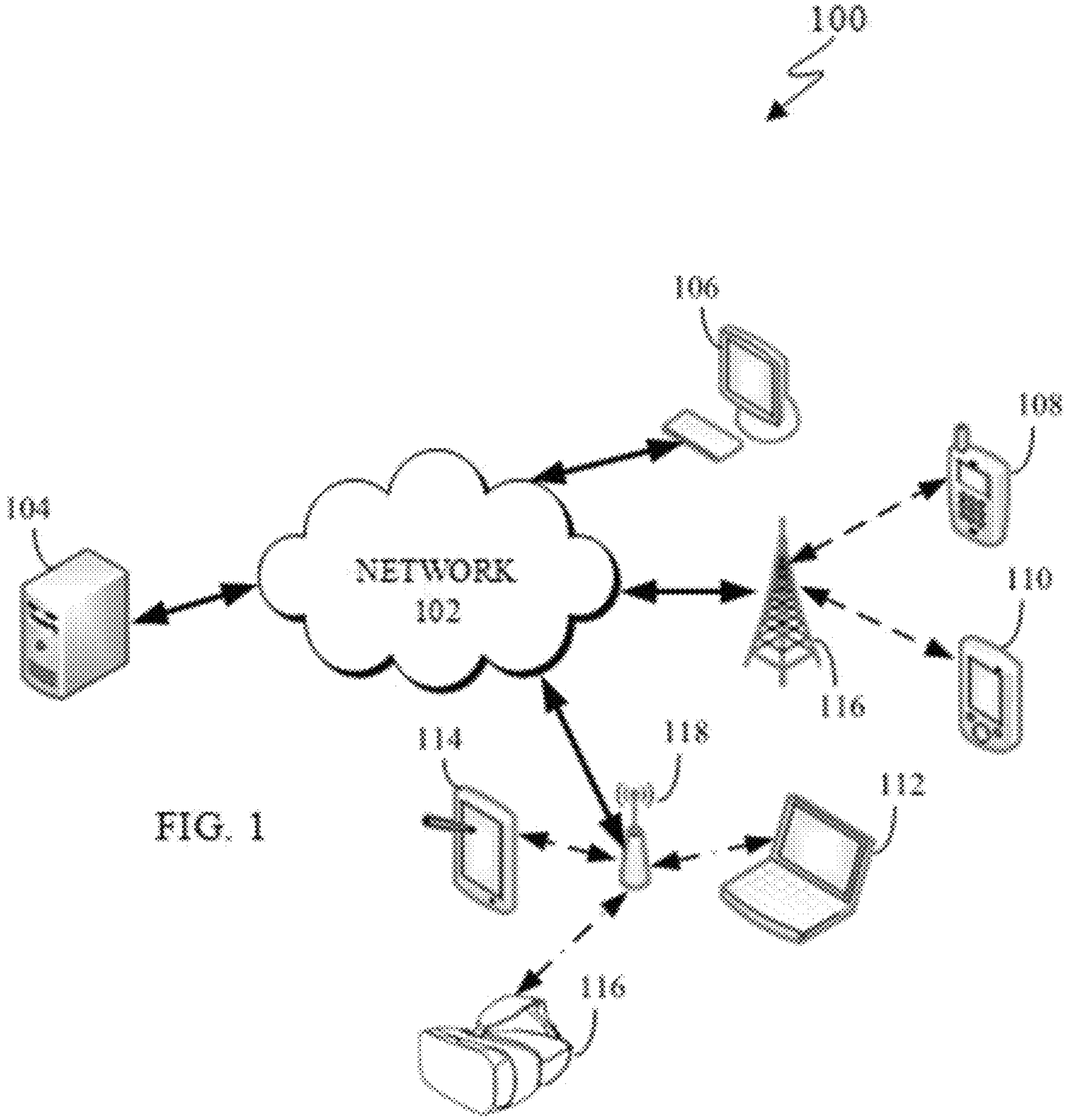
FIG. 1 illustrates an example communication system in accordance with an embodiment of this disclosure.

FIGS. 1 through 21, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz).

The use of computing technology for media processing is greatly expanding, largely due to the usability, convenience, computing power of computing devices, and the like. Portable electronic devices, such as laptops and mobile smart phones are becoming increasingly popular as a result of the devices becoming more compact, while the processing power and resources included a given device is increasing. Even with the increase of processing power portable electronic devices often struggle to provide the processing capabilities to handle new services and applications, as newer services and applications often require more resources that is included in a portable electronic device. Improved methods and apparatus for configuring and deploying media processing in the network is required.

Cloud media processing is gaining traction where media processing workloads are setup in the network (e.g., cloud) to take advantage of advantages of the benefits offered by the cloud such as (theoretically) infinite compute capacity, auto-scaling based on need, and on-demand processing. An end user client can request a network media processing provider for provisioning and configuration of media processing functions as required.

5G network slicing is becoming an important enabler for offering differentiated QoS given a set of service level agreements by the customer/tenant. The mobile network operator, based on service requirements from the tenant/customer, provisions network slices, and run the services requested by the tenant/customer in those network slices. The network operator, assuming different roles, maintain those network slices including orchestration, keep alive, monitoring, and maintenance. However, since the network slice resources are not reliable, network slices may not satisfy the requirements they were initially provisioned with, especially if some of the network slice resources do not provide the expected level of performance. It is likely that the mobile operator replaces those network slices with alternate network slices. The MNO may bring back the original network slice once it starts performing as expected. Appropriate application level mechanisms have to be in place to assist in maintaining service quality during network slice replacement procedures.

Mobile Network Operators are able to offer differentiated services to end users using 5G Network Slicing technology. With network slicing, service providers and content providers (customers of MNO) are able to lease MNO 5G networks to offer services to their end user customers. However, network slicing is still in early stages of standardization and deployment. The resources provisioned in a network slice by the MNO may not be reliable for a long time, so it is highly likely that network slices deteriorate in performance from time to time. One of the coping mechanisms is to migrate application flows of service/content provider services from the deteriorating network slice to alternate network slice. Effective configuration and orchestration capabilities have to be available to making this migration possible, and if required avoid network slice replacement using adaptive mechanisms.

One of the actions that the network functions perform is the process of network slice replacement. However, it is not clear on what basis the network slice replacement is undertaken, the pre-processes and post-processes of such a replacement task. This disclosure provides methods for configuration and management of different processes involved in network slice replacement so as not to impact the use cases and applications using the concerned network slice.

When 5G network entities detect that some network slices are not performing as per expectations, the MNO may decide to replace one or more of those network slices. However, more often than not, the network slices they are replaced with do not provide similar performance, thereby directly impacting the service level agreement (SLA). This disclosure describes aspects related to avoiding network slice replacement based on information from the UE. The disclosure also describes aspects related to reducing the service level requirements with alternate network slices before the original network slice comes back into operation.

Resources provisioned in a network slice include different type of resources such as compute resources, memory resources, storage resources, processing resources, etc. and network functions, AFs 410, data delivery functions, etc. are instantiated using the above resources, often in a virtualized environment. However, it is highly likely that in a virtualized deployment environment, the resources underperform, leading to underperforming network slices. One of the solutions to this problem is to replace primary network slice with an alternate network slice. Application flows may be migrated from primary network slice to alternate network slice, and the MNO may require configuration and provisioning information from the external application service provider how to handle their service traffic if network entities determine to replace the primary network slice with the alternate network slice. This disclosure discusses methods for application service provider assistance to network entities to handle network slice replacement tasks.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s).

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
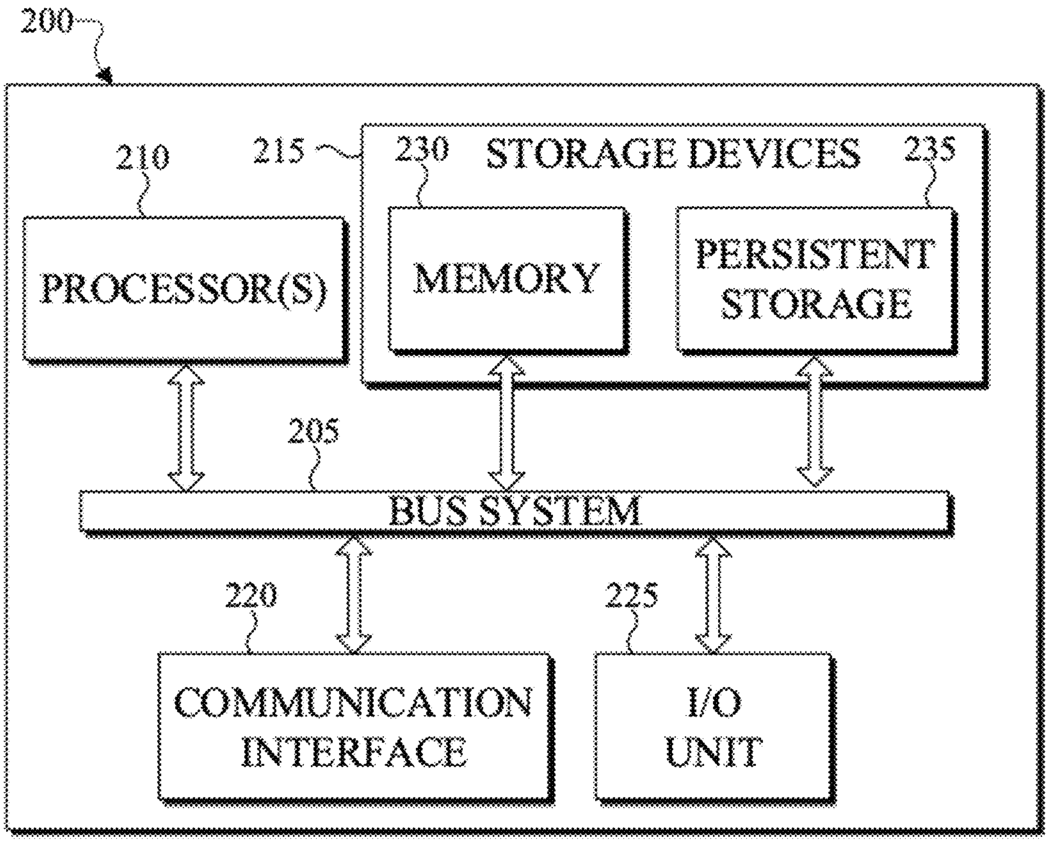
FIGS. 2 and 3 illustrate example electronic devices in accordance with an embodiment of this disclosure.
Figure 3:
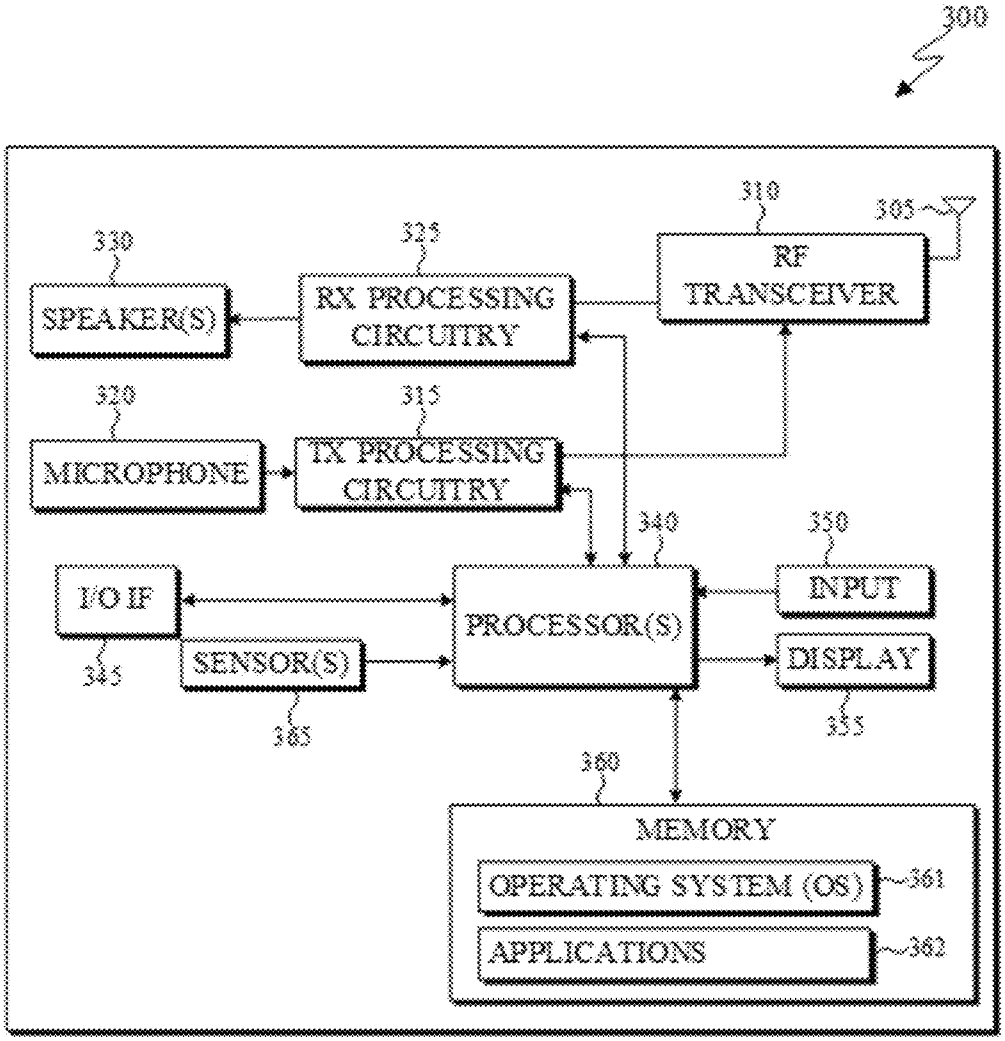

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

3GPP TR 26941 clause 4.2.2 describes network slice replacement procedure when a network slice becomes unavailable. 3GPP TS 23501 clause 5.15.19 describes this procedure further in detail. As part of the procedure, an access and mobility management function (AMF) is triggered, either by local configuration, or due to a notification from operations, administration, and maintenance (OAM), a network slice selection function (NSSF), or policy control function (PCF), to replace the current S-NSSAI with an alternative S-NSSAI. The notifications from the OAM, the NSSF, or the PCF to the AMF may include the alternative S-NSSAI information.

In 3GPP TS 26501 and 3GPP TS 26512, defined are 5G media streaming procedures where in the 5G media streaming (5GMS) application service provider (ASP) performs service provisioning at the 5GMS AF using the M1 interface. 3GPP TS 26512 clause 7.9 describes data model of policy template resource and the M1 policy template provisioning API. The policy template data model includes network slice information as part of the ApplicationSessionContext property. The 5GMS AP can obtain this information from the OAM. However, it is not clear how the policy template provisioning happens for the alternative S-NSSAI if the network slice replacement procedure described in clause 5.15.19 of 3GPP TS 23.501 is previously performed. This disclosure extends network slice replacement aspects, described in U.S. Prov. App. No. 63/543,997 filed on Oct. 13, 2023, Prosecution Id: WD-202310-028-1-USO, Title: Managing network slice Replacement with Application Layer Information and Generic network slice Template, version 7.0, GSM Association, Official Document NG.116, 17 Jun. 2022, which are incorporated by reference in its entirety.

With 5G network slicing, typically a service or content provider (also known as an ASP) negotiates with the network operator for provisioning a service (or ingesting content) that the subscribers of the operator and users of the service providers can use. For provisioning the service, the service provider negotiates a set of service requirements that the operator has to provide so the service provider can deliver the required service experience that the users of the service provider wishes to receive. One way of negotiating service requirements is using the network slice template (NEST) standardized by GSM Association (GSMA).

The GSMA standardized a list of attributes that can characterize a type of network slice. The standardized set of attributes is specified in https://www.gsma.com/newsroom/wp-content/uploads/NG.116-v7.0.pdf. From here in after, in this disclosure, any reference to GSMA NEST template attributes refer to the GSMA NEST specification. Some of the attributes defined by GSMA for NEST template can be found in the following Table 1.

TABLE 1

| Attribute | Description (As specified by GSMA) |
|---|---|
| Availability | (Communication service) availability: percentage value of the amount of time the end-to-end communication service is delivered according to an agreed QoS, divided by the amount of time the system is expected to deliver the end-to-end service according to the specification in a specific area |
| Area of service | Area where the UEs can access a particular network slice |
| Delay tolerance | Amount of time the service can be delayed without affecting service experience. This applies to few use case services that are less sensitive to delay variations, giving the operator some level of flexibility in scheduling service traffic |
| Downlink throughput per network slice | the aggregated data rate in downlink for all UEs together in the network slice (this is not per UE). Some parameters that the can be provisioned are: Guaranteed downlink throughput quota parameter can be specified that describes the guaranteed throughput/data rate supported by the network slice for the aggregate of all GBR QoS flows in downlink belonging to the set of all UEs using the network slice. Maximum downlink throughput: maximum data rate supported by the network slice for all UEs together in downlink. |
| Downlink maximum throughput per UE | the maximum data rate supported by the network slice per UE in downlink |
| Group communication support | describes which type of group communication is provided by the network slice |
| Mission critical support | Mission-critical (MC) leads to a priority of the network slice relative to others, for C-plane (Control Plane) and U-plane (User Plane) decisions. This is relative to a customer provider relationship and to a PMN (Public Mobile Network) |
| Maximum number of PDU sessions | Describes the maximum number of concurrent PDU supported by the network slice |
| Maximum number of UEs | Describes the maximum number of UEs that can use the network slice simultaneously |
| Simultaneous use of the network slice | describes whether a network slice can be simultaneously used by a UE together with other network slices and if so, with which other classes of network slices. |
| Slice quality of service | defines all the QoS relevant parameters supported by the network slice. For the 5G QoS Identifier (5QI) parameter, 3GPP has already defined standardized values (see 3GPP TS 23.501). |
| UE density | describes the maximum number of connected and/or accessible devices per unit area (per $km^2$) supported by the network slice |
| Uplink throughput per network slice | e relates to the aggregated data rate in uplink for all UEs together in the network slice (this is not per UE). Some parameters that the can be provisioned are: Guaranteed uplink throughput quota parameter can be specified that describes the guaranteed throughput/data rate supported by the network slice for the aggregate of all GBR QoS flows in uplink belonging to the set of all UEs using the network slice. Maximum uplink throughput: maximum data rate supported by the network slice for all UEs together in uplink. |

TABLE 1-continued

| Attribute | Description (As specified by GSMA) |
|---|---|
| Uplink maximum throughput per UE | The maximum data rate supported by the network slice per UE in uplink |
| User management | Describes the capability for the network slice customer to manage their users or groups of users' network services and corresponding requirements. For example, a user-list can be specified that specifies which users can access the service in the network slice |
| Latency from (last) UPF to Application Server | Specifies maximum or worst-case one-way latency between UPF, and application server offered by the network slice. This does not include latency introduced by the application server. |

Table 1 above lists only few example attributes of GSMA NEST template. For the purpose of this disclosure, all the attributes specified in GSMA NEST template apply.

Once the ASP negotiates the network slice parameters, the ASP requests a service deployment in the operator network. 3GPP SA4, in TS 26501 and TS 26512 standardized the interface between the ASP and operator function, such as an application function (AF). One of the service configuration options, among many options configured by the ASP at the AF as specified in TS 26501 and TS 26512, is the configuration of policy templates as specified in clause 7.9 of TS 26512. Some of the parameters for policy configuration specified in TS 26512 are shown in Table 2.

TABLE 2

3GPP Specified Policy Configuration parameters for a Media Service

| Property | Type | Cardinality | Usage | Visibility | Description |
|---|---|---|---|---|---|
| policyTemplateId | ResourceId | 1 . . . 1 | C: RO<br>R: RO<br>U: RO | | Unique identifier of this Policy Template within the scope of the Provisioning Session. |
| qoSSpecification | M1QoSSpecification | 0 . . . 1 | C: RW<br>R: RO<br>U: RW | | Specifies the network quality of service to be applied to media streaming sessions at this Policy Template. |
| applicationSessionContext | Object | 1 . . . 1 | | | Specifies information about the application session context to which this Policy Template can be applied. |
| afAppId | AfAppId | 0 . . . 1 | C: RW<br>R: RW<br>U: RW | | As defined in clause 5.6.2.3 of TS 29.514 and clause 5.3.2 of TS 29.571. |
| sliceInfo | Snssai | 0 . . . 1 | C: RW<br>R: RW<br>U: RW | | |
| dnn | Dnn | 0 . . . 1 | C: RW<br>R: RW<br>U: RW | | |
| aspId | AspId | 1 . . . 1 | C: RW<br>R: RW<br>U: RW | | |

As shown in Table 2, a set of policy templates are configured for the media service. Policy templates are applicable for a given application session context that includes network sliceInfo (network slice information) and DNN (DNN information).

3GPP TR 28.809 is the result of a feasibility study that looked into aspects of management data analytics. Clause 6 of 3GPP TR 28.809 specifies use cases, potential requirements and possible solutions for management data analytics. One of the issues relating to service-level specifications documented in clause 6.3.2 of 3GPP TR 28.809 is the issue of network slice load analysis—"Network slice load may vary over time. Therefore, network resources allocated initially could not always satisfy the traffic requirements, for example, the network slice may be overloaded or underutilized. Various factors may impact the network slice load, e.g., number of UEs accessing the network, number of PDU sessions, service types and the end user's distribution. Overload of signaling in control plane and/or user data congestion in user plane may lead underperforming network. Besides, allocating excessive resources for network slice with light load may decrease resource efficiency.

Clause 5.1 of TR 23700-41 describes a related key issue "Key Issue #1: Support of network slice Service Continuity" in terms similar to the issue described above in 3GPP TR 28.809. Specifically, aspects related to service continuity are being studied for two scenarios—a "no mobility" scenario and an "inter-RA mobility" scenario—in the case when a network slice or network slice instance in the Core Network (CN) or target CN is overloaded or undergoing planned maintenance (e.g., network slice termination), and the network performance of the network slice cannot meet the SLA.

The 3GPP SA2 has standardized the feature of network slice replacement and specified in clause 5.15.19 of 3GPP TS 23.501. As part of this procedure, either the AMF, PCF, NSSF, or the OEM can make decisions to replace the current network slice with an alternate network slice for some PDU sessions when the current network slice is unable to provide required performance at certain times. However, the concept of network slicing is still at infancy with respect to standardization and implementation, so the procedure for network slice replacement is not clearly understood.

Figure 4A:
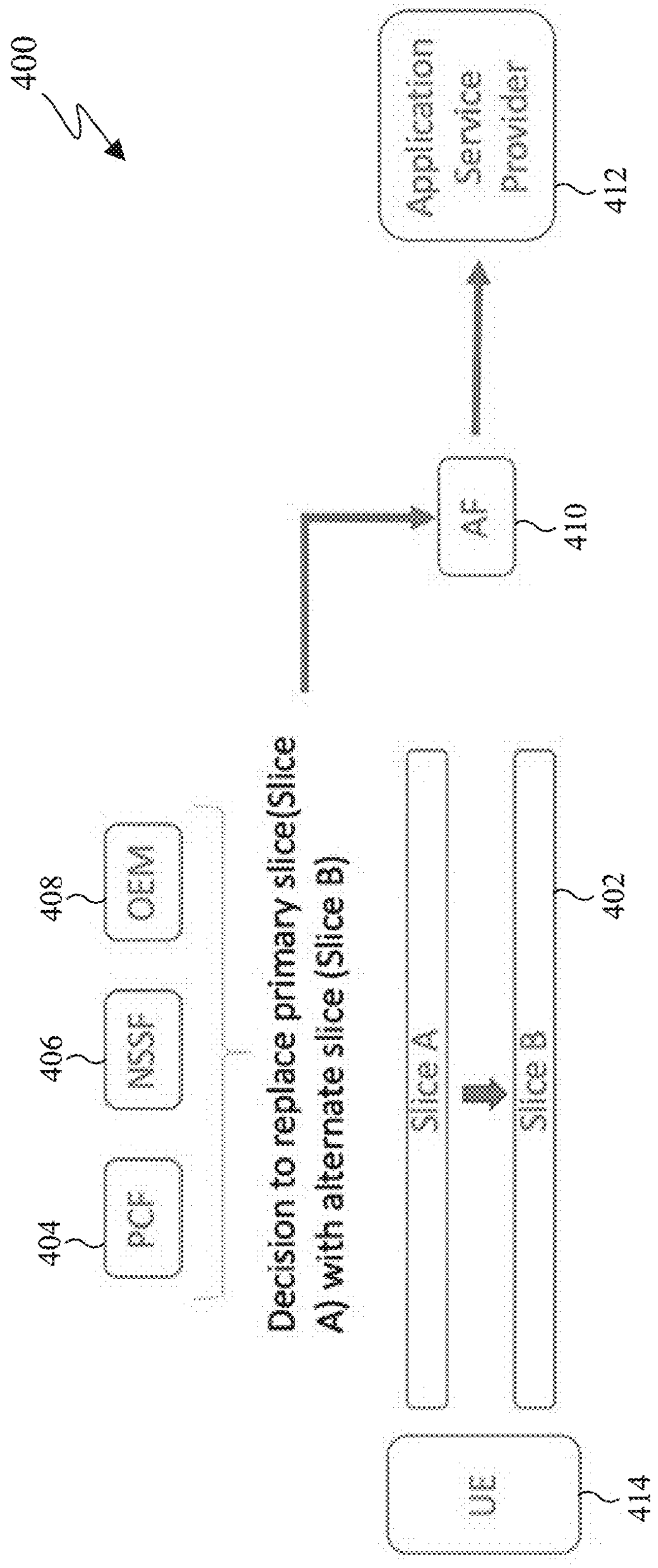
FIGS. 4A and 4B illustrate example systems for notification of network slice replacement in accordance with this disclosure.
Figure 4B:
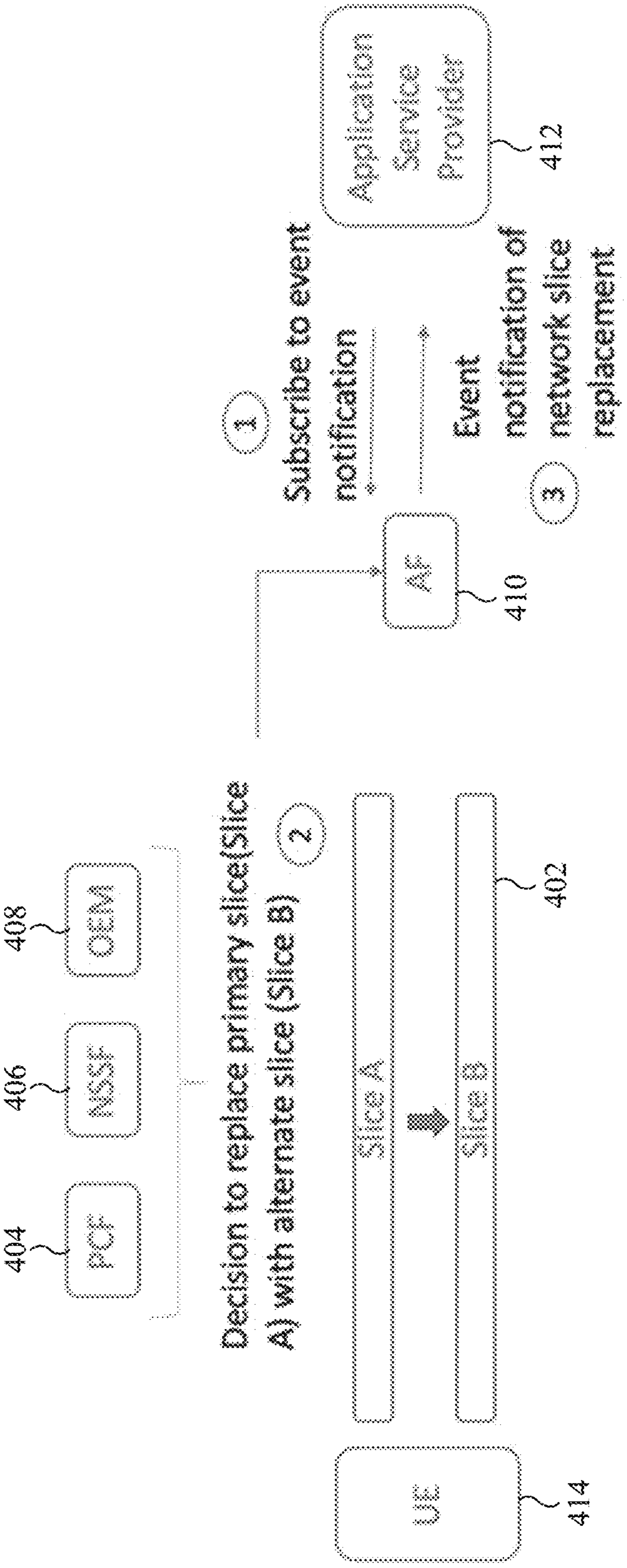

FIGS. 4A and 4B illustrate example systems 400, 401 for notification of network slice replacement in accordance with this disclosure. The embodiment of the system 400 illustrated in FIGS. 4A and 4B are for illustration only. FIGS. 4A and 4B do not limit the scope of this disclosure to any particular implementation of an electronic device.

As shown in FIG. 4A, when the decision for replacing a network slice 402 is taken by either the PCF 404, the NSSF 406, or the OEM 408, the information is exchanged with the AF 410. The AF 410 then exchanges the network slice replacement information with ASP 412.

As shown in FIG. 4B, the ASP 412 can subscribe with the AF 410 for network slice change information event notifications at step 1. When the network slice event happens at step 2, the AF 410 notifies the ASP 412 of such an event at step 3.

As shown in FIGS. 4A and 4B, the ASP 412 may be aware of possible network slice replacement if going forward with deploying the service in the operator network. The OEM 408 may inform the ASP 412, as part of network slice negotiation, that conditions exist that the given network slice 402 may potentially be replaced with an alternate network slice 402. In this case, the ASP 412 may configure the parameters for the primary network slice 402 and the alternate network slice 402.

In addition to the configuration for parameters described in Table 1 and GSMA specified NEST template parameters for the primary network slice 402, the ASP 412 may configure the same set of parameters for alternate network slice 402 as well. The configuration of network slice parameters for alternate network slice 402 tells the OEM 408 that the ASP 412 is looking for an alternate network slice 402 that can satisfy the given service requirements in the alternate network slice 402 in case the operator decides to carry out the network slice replacement procedure. The service requirements, or the configuration of the parameters for attributes described in GSMA NEST template, for the alternate network slice 402 may be lower than that of the primary network slice 402. The ASP 412 may specify a minimum network slice configuration descriptor, which provides the absolute minimum parameter values for each of the attributes of the GSMA NEST template if the service for the UE 414 is moved to the alternate network slice 402. Instead of providing absolute values for each of the attributes applicable for the alternate network slice 402, the ASP 412 may configure a network slice offset for the attribute compared to the value in that of the primary network slice 402. For example, if the ASP 412 configures a downlink throughput per network slice 402 of 200 mbps, then for the alternate network slice 402, for the same parameter of downlink throughput per network slice 402, an offset of x % (e.g., 20%) can be specified. In this case, this signals to the network slice provider, or the operator, that the ASP 412 may go down 20% on the downlink throughput in the alternate network slice 402 if the operator decides to go forward with network slice replacement. The offset could be any mathematical offset (e.g., linear, exponential etc.). In another option, the ASP 412 may just send a message to AF 410 to match the configuration of the alternate network slice 402 to that of the primary network slice 402. For this option, in the service provisioning message from the ASP 412 to the AF 410, the ASP 412 includes a Boolean variable called "match-configuration", and if set to true, indicates to the AF 410 that the AF 410 matches the parameters in the alternate network slice 402 to that of the primary network slice 402.

In addition to the configuration for parameters described in Table 2 for policies applicable to the primary network slice 402, the ASP 412 may configure the policy parameters for alternate network slice 402 as well. The configuration of policy parameters for alternate network slice 402 tells the OEM 408 that the ASP 412 is looking for an alternate network slice 402 that can satisfy the given policy requirements in the alternate network slice 402 in case the operator decides to carry out the network slice replacement procedure. The policy configuration for the alternate network slice 402 may be lower than that of the primary network slice 402, i.e., the policy parameters that are part of M1QoSSpecification structure specified in TS 26512 clause 6.5.3.4, may have a comparatively lower values than the values for the same parameters for the primary network slice 402. The ASP 412 may specify a minimum policy configuration descriptor, which provides the absolute minimum parameter values for each of the policy parameters applicable for the alternate network slice 402. Instead of providing absolute values for each of the policy parameters applicable for the alternate network slice 402, the ASP 412 may configure an offset for the policy compared to the value in that of the primary network slice 402. For example, if the ASP 412 configures a maximum bit rate uplink policy parameter of 50 mbps, then for the alternate network slice 402, for the same parameter of maximum bit rate uplink, an offset of x % (e.g., 20%) can be specified. In this case, this signals to the network slice provider, or the operator, that the ASP 412 may go down 20% on the maximum bit rate uplink policy parameter in the alternate network slice 402 if the operator decides to go forward with network slice replacement. The offset could be any mathematical offset (e.g., linear, exponential etc.). In another option, the ASP 412 may just send a message to AF 410 to match the policy configuration of the alternate network slice 402 to that of the primary network slice 402. For this option, in the service provisioning message from the ASP 412 to the AF 410, the ASP 412 includes a Boolean variable called "match-policy-configuration", and if set to true, indicates to the AF 410 that the AF 410 has to match the parameters in the alternate network slice 402 to that of the primary network slice 402.

It is possible that ASP 412 may not be aware of possible network slice replacement during the service provisioning stage. Without this information, ASP 412 proceeds with service configuration as specified in TS 26501 and TS 26512. The policy parameters are specified by the ASP 412 only for the primary network slice 402. The AF 410 then deploys and starts the service in the network slice 402 as requested. After a certain time, the network functions such as the PCF 404, the NSSF 406, and the OEM 408 decide that the primary network slice 402 for the service has to be replaced with an alternate network slice 402. In this case, ASP 412 receives information from the AF 410 as described earlier in the disclosure about network slice replacement. When ASP 412 receives the network slice replacement information from the AF 410, the ASP 412 may configure the parameters for the alternate network slice 402 at the AF 410.

The ASP 412 may configure the parameters described in Table 1 and GSMA specified NEST template parameters for the alternate network slice 402 as an update for the session that was operating in the primary network slice 402. The configuration of parameters for an alternate network slice 402 is similar to the configuration of parameters for the primary network slice 402. The service requirements, or the configuration of the parameters for attributes described in GSMA NEST Template, for the alternate network slice 402 may be lower than that of the primary network slice 402. The ASP 412 may specify a minimum network slice configuration descriptor, which provides the absolute minimum parameter values for each of the attributes of the GSMA NEST template compared to the parameters for the primary network slice 402. Instead of providing absolute values for each of the attributes applicable for the alternate network slice 402, the ASP 412 may configure a network slice offset for the attribute compared to the value in that of the primary network slice 402. For example, if the ASP 412 configures a downlink throughput per network slice 402 of 200 mbps, then for the alternate network slice 402, for the same parameter of downlink throughput per network slice 402, an offset of x % (e.g., 20%) can be specified. In this case, this signals to the network slice provider, or the operator, that the ASP 412 may go down 20% on the downlink throughput in the alternate network slice 402. The offset could be any mathematical offset (e.g., linear, exponential etc.). In another option, the ASP 412 may just send a message to AF 410 to match the configuration of the alternate network slice 402 to that of the primary network slice 402. For this option, in the service provisioning message from the ASP 412 to the AF 410, the ASP 412 includes a Boolean variable called "match-configuration", and if set to true, indicates to the AF 410 that the AF 410 matches the parameters in the alternate network slice 402 to that of the primary network slice 402.

The ASP 412 may configure the policy parameters described in Table 2 for policies applicable to alternate network slice 402 as an update for the session that was operating in the primary network slice 402. The configuration of parameters for an alternate network slice 402 is similar to the configuration of parameters for the primary network slice 402. The policy configuration for the alternate network slice 402 may be lower than that of the primary network slice 402, i.e., the policy parameters that are part of M1QoSSpecification structure specified in TS 26512 clause 6.5.3.4, may have a comparatively lower values than the values for the same parameters for the primary network slice 402. The ASP 412 may specify a minimum policy configuration descriptor, which provides the absolute minimum parameter values for each of the policy parameters applicable for the alternate network slice 402 compared to the corresponding parameters for primary network slice 402. Instead of providing absolute values for each of the policy parameters applicable for the alternate network slice 402, the ASP 412 may configure an offset for the policy compared to the value in that of the primary network slice 402. For example, if the ASP 412 configures a maximum bit rate uplink policy parameter of 50 mbps, then for the alternate network slice 402, for the same parameter of maximum bit rate uplink, an offset of x % (e.g., 20%) can be specified. In this case, this signals to the network slice provider, or the operator, that the ASP 412 may go down 20% on the maximum bit rate uplink policy parameter in the alternate network slice 402. The offset could be any mathematical offset (e.g., linear, exponential etc.). In another option, the ASP 412 may just send a message to AF 410 to match the policy configuration of the alternate network slice 402 to that of the primary network slice 402. For this option, in the service provisioning message from the ASP 412 to the AF 410, the ASP 412 includes a Boolean variable called "match-policy-configuration", and if set to True, indicates to the AF 410 that the AF 410 has to match the parameters in the alternate network slice 402 to that of the primary network slice 402.

Although FIGS. 4A and 4B illustrate example systems 400 for notification of network slice 402, various changes may be made to FIGS. 4A and 4B. For example, the number and placement of various components of the system 400 can vary as needed or desired. In addition, the system 400 may be used in any other suitable multimedia process and is not limited to the specific processes described above.

Figure 5:
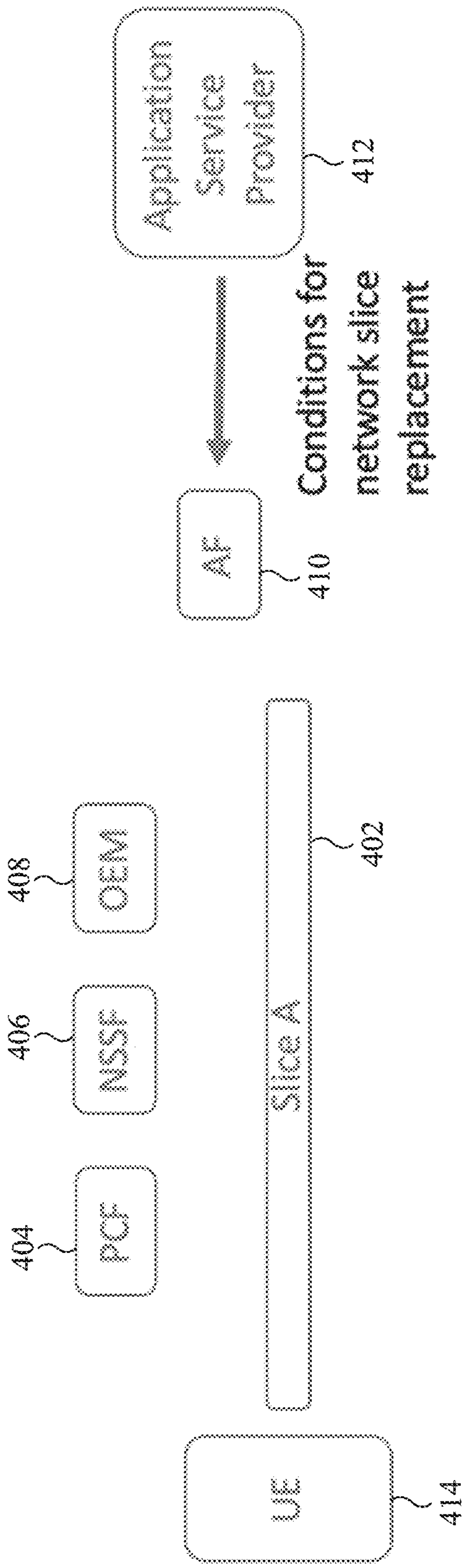
FIG. 5 illustrates an example system for conditions for network slice replacement in accordance with this disclosure.

FIG. 5 illustrates an example system 500 for conditions for network slice replacement in accordance with this disclosure. The embodiment of the system 500 illustrated in FIG. 5 is for illustration only. FIG. 5 does not limit the scope of this disclosure to any particular implementation of an electronic device.

As shown in FIG. 5, network functions in the 5G network, depending on the network slicing conditions, may decide to undertake the network slice replacement procedure. However, it is not clear how such a decision is made in the first place. In this disclosure, described is a method where in the information to undertake the replacement procedure is specified by the ASP 412. In addition, additional information may be included that indicates how the AF 410 manages the service because of the consequences of performing network slice replacement. The ASP 412 may include the following information to the AF 410 while performing the service provisioning procedure. The original procedure for service provisioning is described in TS 26501 and TS 26512. The service configuration information from the ASP 412 to the AF 410 is augmented below with the below information in Table 3.

TABLE 3

| Information Element | Description |
|---|---|
| Network-slice-congestion | By including this information, ASP indicates to the AF that the network slice replacement is to be performed when network slice becomes congested.<br>When the AF receives this information element from ASP, the AF may provision data collection in the network to identify congestion. When the corresponding event happens, AF will request network functions to perform network slice replacement. |
| Network-slice-unavailable | By including this information, ASP indicates to the AF that the network slice replacement is to be performed when network slice becomes unavailable.<br>When the AF receives this information element from ASP, the AF may provision data collection in the network to identify availability of network slice. When the corresponding event happens, AF will request network functions to perform network slice replacement. |
| User count | By including this information, ASP indicates to the AF that the network slice replacement is to be performed when the number of users using the network slice exceed the given user count information.<br>When the AF receives this information element from ASP, the AF will keep tact of number of users, and when the number of users using the service in the network slice exceed the given user count, will go ahead with the network slice replacement procedure. |

TABLE 3-continued

| Information Element | Description |
|---|---|
| Conditions-to-stop-service | Information indicating when the service is to be stopped because of network slice replacement. Information such as the following may be included:<br>Minimum-SLA: Information indicating minimum SLA after network slice replacement. If the network cannot provide minimum SLA given by this information, then the ASP intends that the network stop the service. The type parameters in this Minimum-SLA information is similar to the parameters discussed earlier in the disclosure.<br>Min-user-count: Information indicating that the service is to be stopped when not able to provide service to specified minimum number of users.<br>Acceptable-drop off: Information providing acceptable drop off conditions before stopping the service.<br>Restart-after-time-interval: Time when the service is to be restarted when the conditions in this information are met. |
| Conditions-to-pause-service | Information indicating when the service is to be paused post network slice replacement procedure. Information such as the following may be included:<br>Minimum-SLA: Information indicating minimum SLA after network slice replacement. If the network cannot provide minimum SLA given by this information, then the ASP intends that the network pause the service. The type parameters in this Minimum-SLA information is similar to the parameters discussed earlier in the disclosure.<br>Min-user-count: Information indicating that the service is to be paused when not able to provide service to specified minimum number of users.<br>Restart-after-time-interval: Time when the service is to be restarted when the conditions in this information are met. |
| Preserve-compute-affinity | Information indicating that the ASP prefers using the same compute instances/machines from the current primary network slice to be used in the alternate network slice as well.<br>When AF receives this message, it will use the same compute instances/machines in the new alternative network slice. With newer network configuration in the alternative network slice, the performance may be better than that of the primary network slice. With this option, there is no need to perform application context transfer between instances/machines in different network slices because of network slice replacement. |
| Preserve-storage-affinity | Information indicating that the ASP prefers using the same storage volumes/drives from the current primary network slice to be used in the alternate network slice as well.<br>When AF receives this message, it will use the same storage volumes/drives in the new alternative network slice. With newer network configuration in the alternative network slice, the performance may be better than that of the primary network slice. With this option, there is no need to transfer data belonging to the application/session from primary network slice to alternate network slice. |

Although FIG. 5 illustrates an example system 500 for conditions for network slice replacement, various changes may be made to FIG. 5. For example, the number and placement of various components of the system 500 can vary as needed or desired. In addition, the system 500 may be used in any other suitable multimedia process and is not limited to the specific processes described above.

Figure 6:
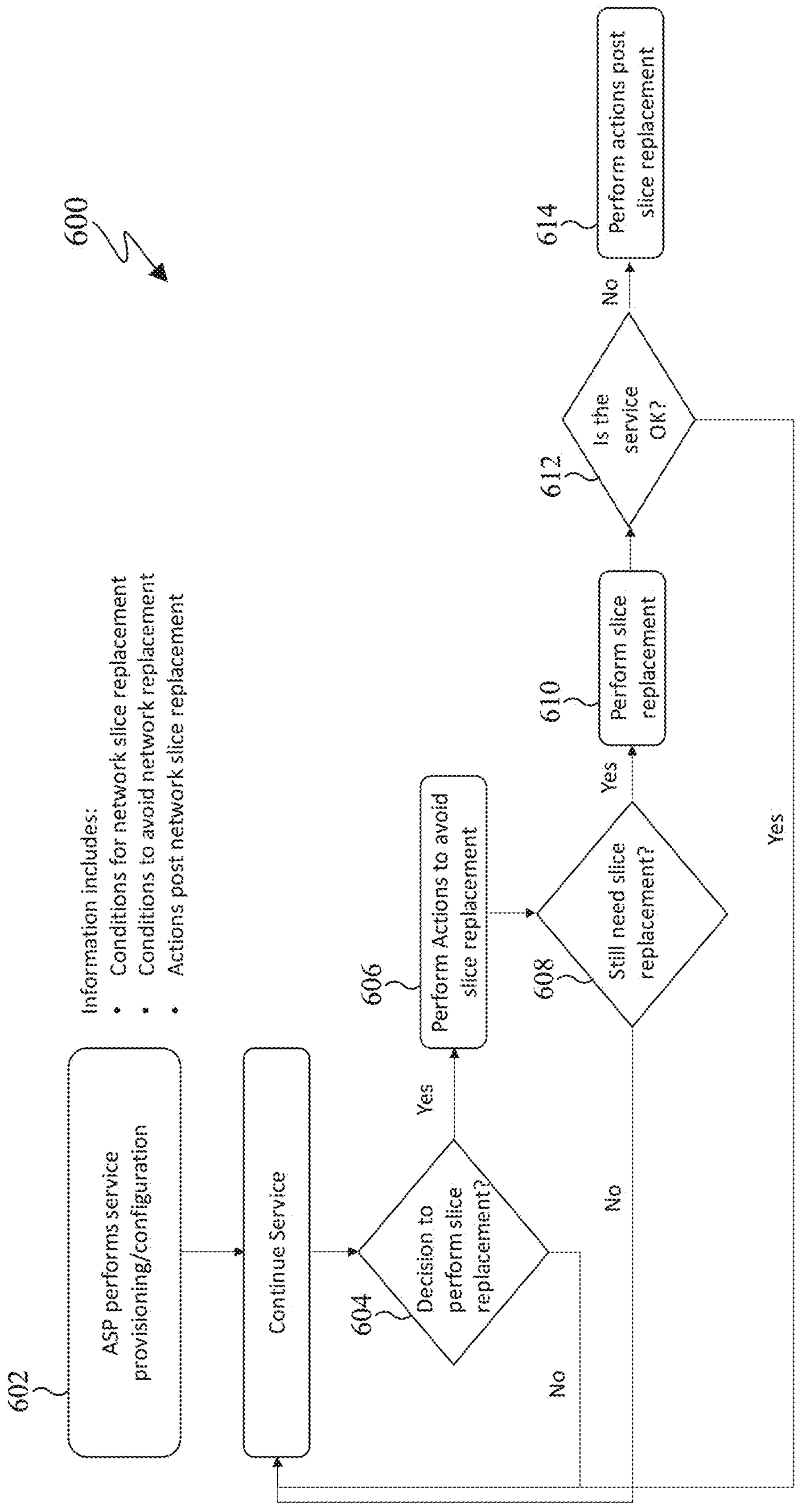
FIG. 6 illustrates an example method for network slice replacement for multimedia services according to this disclosure.

FIG. 6 illustrates an example method 600 for network slice replacement for multimedia services according to this disclosure. For ease of explanation, the method 600 of FIG. 6 is described as being performed using the electronic device 300 of FIG. 3. However, the method 600 may be used with any other suitable system and any other suitable electronic device, including server 200 of FIG. 2 and the ASP 412 of FIGS. 4A through 5, 7 through 10, and 14 through 20.

As shown in FIG. 6, the electronic device 300 performs service provisioning and configuration of the network slice replacement at step 602. The information provisioned and configured includes conditions for network slice replacement, actions and conditions to avoid network slice replacement, and actions for post network slice replacement. The electronic device performs service provisioning and configuration at the AF 410 inside the operator network. As part of the service configuration information, ASP 412 provisions alternate network slice 402 along with primary network slice 402 if ASP 412 is aware of potential network slice replacement. Alternative, if ASP 412 is not aware of potential network slice replacement, and then later gets notified by AF 410, the ASP 412 may update configuration for alternate network slice 402. The type of configuration for alternate network slice 402 in relation to primary network slice 402 is described in the disclosure earlier. In addition, the ASP 412 configures the conditions for network slice replacement, conditions to avoid network replacement, and the actions to perform post network slice replacement at the AF 410 as described in the disclosure. After service provisioning, the service is started and continues as provisioned by the ASP 412.

The electronic device 300 determines whether to perform network slice replacement at step 604. Service is continued when network slice replacement is not to be performed. When the network (e.g., the PCF 404, the NSSF 406, the OEM 408, etc.) detects the need for network slice replacement, the AF 410 performs the conditions/actions to avoid network slice replacement as described in the disclosure.

When network slice replacement is determined to be performed, the electronic device 300 performs the actions to avoid network slice replacement at step 606. Examples of actions to avoid network slice replacement can be found in TABLE 5. For example, actions to avoid network slice replacement can include at least one of lowering availability of the service, reducing area of the service, increasing delay tolerance, lowering throughput per network slice, reducing support for group communication, reducing service adaptations, and reducing a number of supported UEs 414. The action to avoid the network slice replacement can be configured based on feedback from a UE 414.

The electronic device 300 determines whether the action to avoid network slice replacement negated the need for network slice replacement at step 608. Conditions for network slice replacement are compared to the parameters of the service to determine whether the network slice replacement can be avoided.

The electronic device 300 performs network slice replacement by moving the application flows to an alternate network slice 402 at step 610. After performing actions to avoid network slice replacement, if the network still sees a need for network slice replacement, then the primary network slice 402 is replaced with the alternative network slice 402 contingent on the alternate network slice 402 satisfying the requirements for the service as provisioned by the ASP 412.

The electronic device 300 determines whether the network slice replacement to the alternative network slice 402 has sufficient performance for the application flows at step 612. The determination can be based on the conditions for network slice replacement. The electronic device 300 can receive an indication for network slice replacement. The indication can be for immediately performing a network slice replacement or for performing a network slice replacement at a specified time. The electronic device 300 can perform the first action to avoid the network slice replacement at step 2108.

The electronic device 300 performs the action for post network slice replacements in step 614. After performing network slice replacement, all actions post network slice replacement are performed. The electronic device 300 can determine whether the service meets a minimum SLA and upon determining that the minimum SLA is not met, stopping or pausing the service.

Although FIG. 6 illustrates one example of a method 600 for network slice replacement for multimedia services, various changes may be made to FIG. 6. For example, while shown as a series of steps, various steps in FIG. 6 may overlap, occur in parallel, or occur any number of times.

Figure 7:
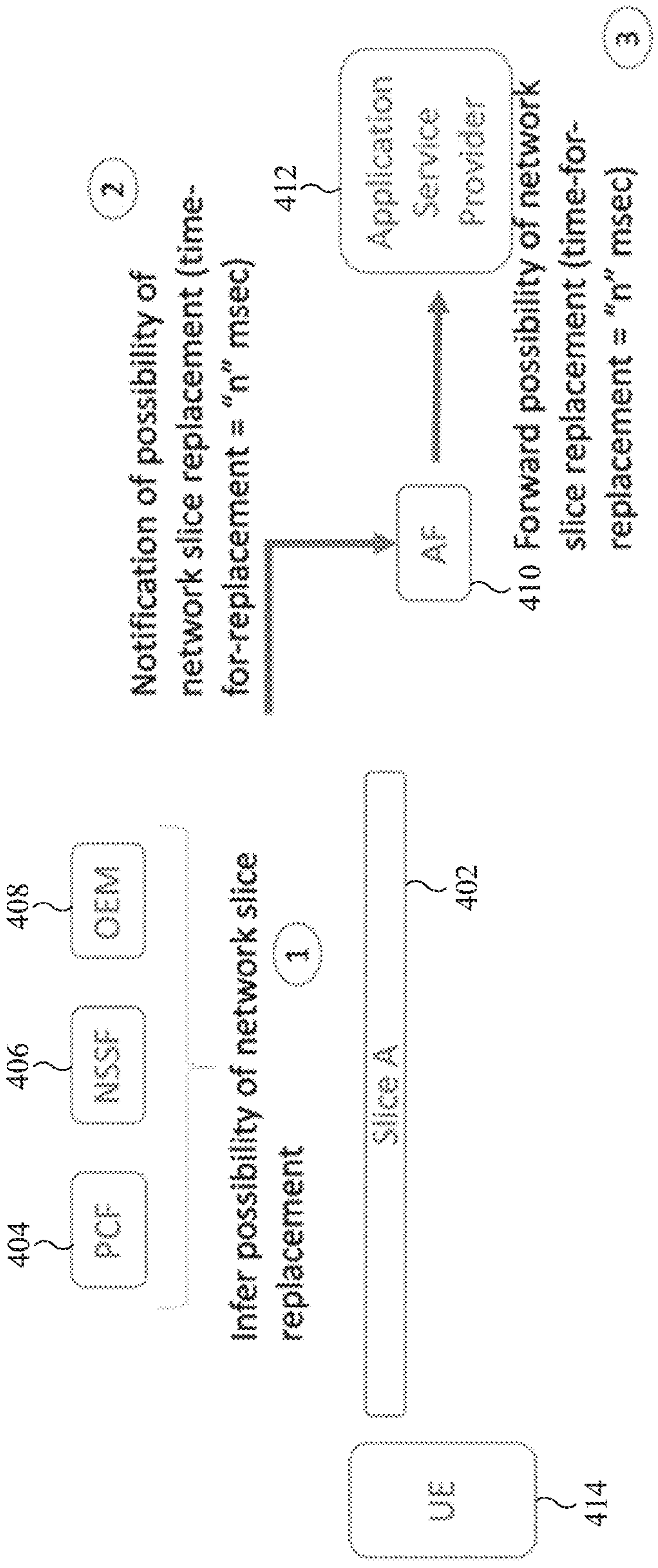
FIG. 7 illustrates an example system for a possibility of network slice replacement in accordance with this disclosure.

FIG. 7 illustrates an example system 700 for a possibility of network slice replacement in accordance with this disclosure. The embodiment of the system 700 illustrated in FIG. 7 is for illustration only. FIG. 7 does not limit the scope of this disclosure to any particular implementation of an electronic device.

As shown in FIG. 7, system 700 provides the notification of network slice replacement may also happen well in advance when the network functions foresee network slice replacement possibilities. This is the case where the conditions for network slice replacement have not satisfied yet, but the network functions (for example, the AF 410, the network data analytics function (NWDAF)) sees more than a reasonable possibility of network slice replacement in near future. In this case, the AF 410 may receive a notification from network functions of anticipated network slice replacement, including additional information such as "time-for-replacement" with a value approximate to the anticipated time for network slice replacement. When the AF 410 receives a message with anticipated time for network slice replacement, the AF 410 may notify the ASP 412 of such an event in the future. When the ASP 412 receives this message from the AF 410, ASP 412 may perform any of the steps described in this disclosure including, provisioning of alternate network slice 402 (if known) or negotiating with OAM about requirements for alternate network slice 402, etc.

Although FIG. 7 illustrates an example system 700 for a possibility of network slice replacement, various changes may be made to FIG. 7. For example, the number and placement of various components of the system 700 can vary as needed or desired. In addition, the system 700 may be used in any other suitable multimedia process and is not limited to the specific processes described above.

Figure 8:
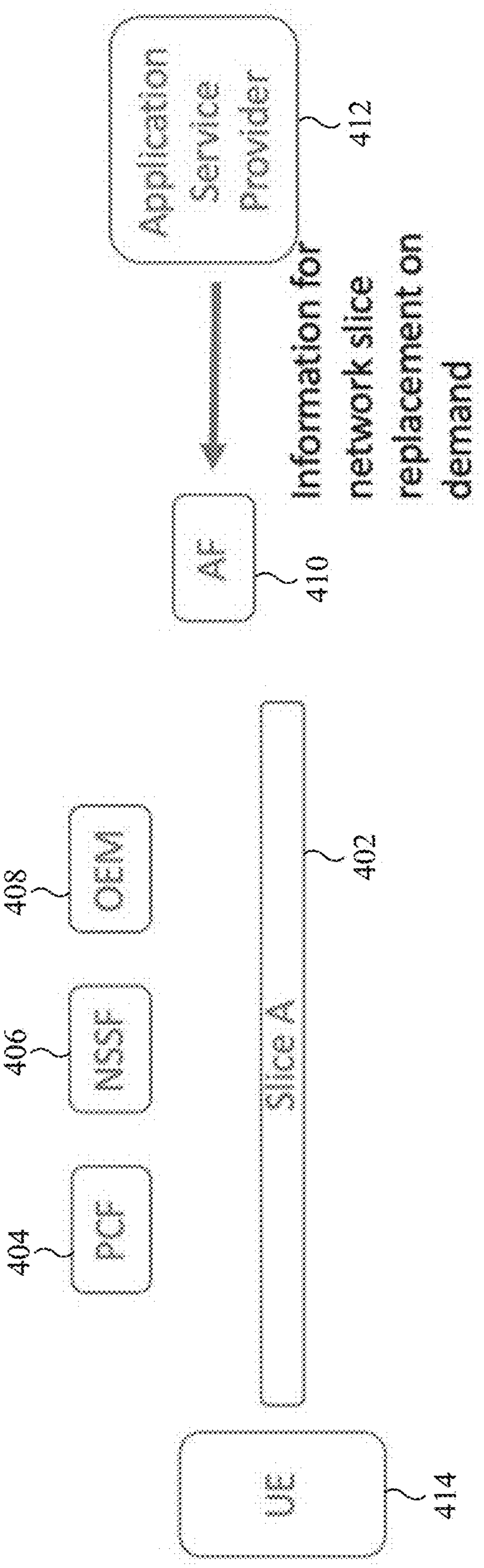
FIG. 8 illustrates an example system providing information of network slice replacement on demand in accordance with this disclosure.

FIG. 8 illustrates an example system 800 providing information of network slice replacement on demand in accordance with this disclosure. The embodiment of the system 800 illustrated in FIG. 8 is for illustration only. FIG. 8 does not limit the scope of this disclosure to any particular implementation of an electronic device.

As shown in FIG. 8, system 800 provides a procedure for network slice replacement on demand. Using this procedure, the network slice replacement is undertaken on demand, i.e., well ahead of meeting the conditions for replacement. To facilitate this procedure, the ASP 412 includes the information in its service configuration message to the AF 410 shown in Table 4.

TABLE 4

| Information Element | Description |
|---|---|
| Replacement-on-demand | Boolean variable indicating the preference of ASP to facilitate replacement-on-demand when the ASP deems proper to do so. When the AF gets this information from the ASP, the AF will watch for network slice replacement command from the ASP. |
| Go-with-slice-replacement | Information from the ASP to AF indicating that the network slice has to be replaced now. When the AF receives this information from the ASP in another message, will perform necessary actions to facilitate network slice replacement procedure for the requested service. |
| Replacement-at-time | Information indicating that the ASP intends AF to facilitate network slice replacement at certain time. This information can be sent either during the initial service provisioning, or a later stage during the session. When AF receives this information, AF will wait until the given time to facilitate network slice replacement. |

Although FIG. 8 illustrates an example system 800 providing information of network slice replacement on demand, various changes may be made to FIG. 8. For example, the number and placement of various components of the system 800 can vary as needed or desired. In addition, the system 800 may be used in any other suitable multimedia process and is not limited to the specific processes described above.

Figure 9:
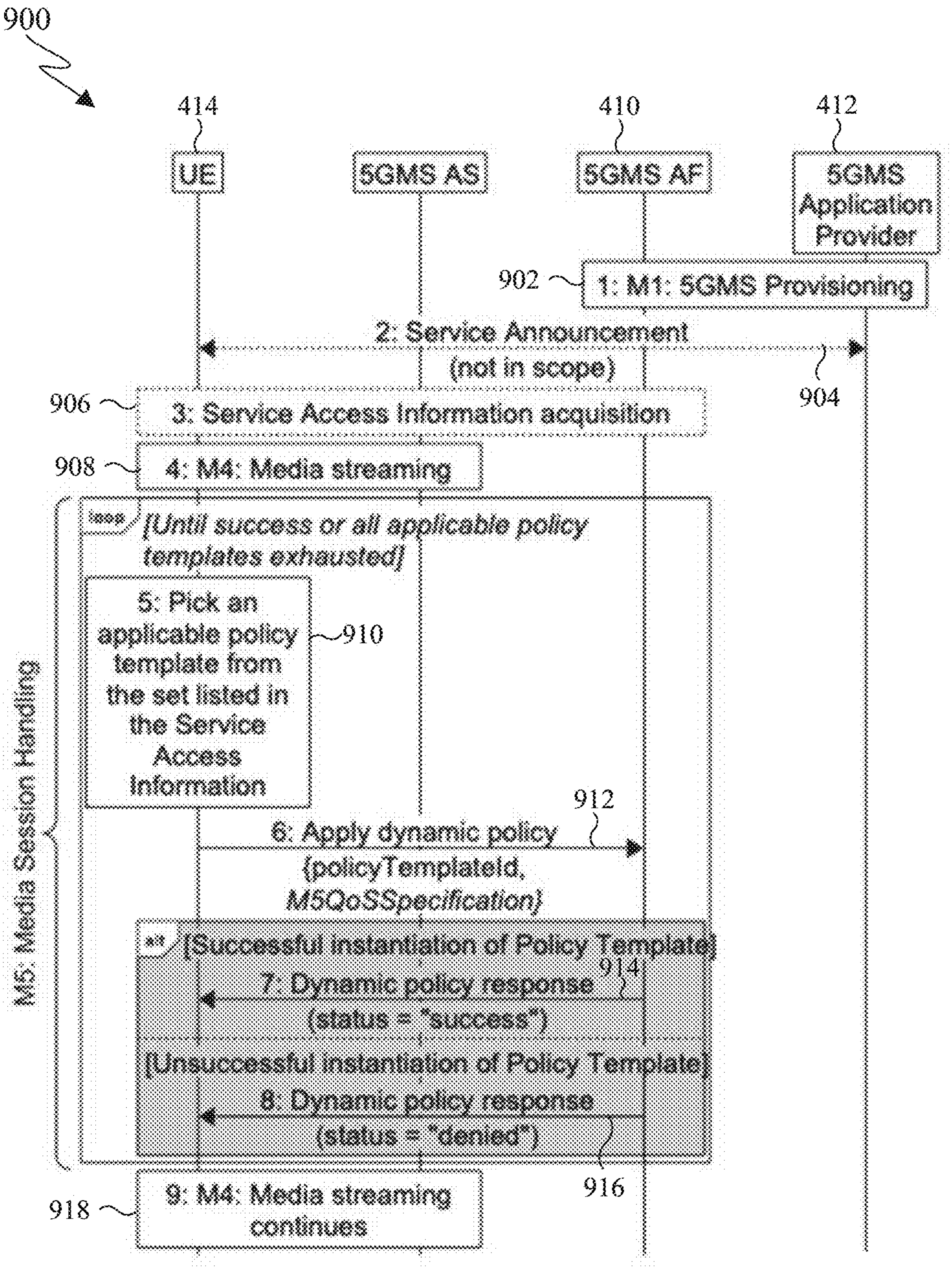
FIG. 9 illustrates one example of a method for dynamic policy invocation according to this disclosure.

FIG. 9 illustrates an example method 900 for dynamic policy invocation according to this disclosure. For ease of explanation, the method 900 of FIG. 9 is described as being performed using the UE 414, the AF 410, and the ASP 412 of FIGS. 4A through 5, 7 through 10, and 14 through 20. However, the method 900 may be used with any other suitable system and any other suitable electronic devices.

As introduced in clause 4.2.3 of 3GPP TR 26941, clause 5.1 of 3GPP TR 23700-41 studies a key issue on network slice service continuity. According to this, a network slice 402 or a network slice instance can become overloaded or the performance of the network slice 402 may fall below the requirements of its SLA.

The recommendation in clause 8.1 of TR 23700-41 is for the 5G system to identify an alternative network slice 402 to migrate application flows from the PDU session of the current network slice 402 to the existing PDU session or a new one in the chosen alternative network slice 402. When 5G media streaming sessions are carried over a PDU sessions that cannot be migrated transparently to the application layer with the support of the service continuity procedure, the impacts on ongoing 5G media streaming sessions can be studied. As shown in FIG. 9, the 5GMS ASP 412 configures a provisioning session at the 5GMS AF 410 at step 902.

The 5GMS ASP 412 provides service announcement information to the 5GMS-aware application in the UE 414 as described in step 4 of clause 5.1 for downlink streaming and step 4 of clause 6.1 for uplink streaming in TS 26.501 at step 904. In case the 5GMS client in the UE 414 received only a reference to the service access information, then the UE 414 acquires the service access information from the 5GMS AF 410 as described in step 6 of clause 5.1 of 3GPP TS 26.501 at step 906.

Media streaming procedures are then carried out at reference point as specified in step 8 of clause 5.1 for downlink media streaming and step 8 of clause 6.1 for uplink media streaming in 3GPP TS 26.501 at step 908.

The media session handler picks an applicable policy template at step 910. Given a set of applicable policy templates whose ApplicationSessionContext information matches that of the current application flow (i.e., matching S-NSSAI and DNN information), steps 5-8 below are repeated until either the 5GMS AF 410 accepts instantiation of a policy template for the application flow or until all the applicable policy templates have been exhausted. The details of the dynamic policy procedure at reference point M5 is specified in step 7 of clause 5.1 for downlink media streaming and step 7 of clause 6.1 for uplink media streaming in 3GPP TS 26.501.

The media session handler requests the 5GMS AF 410 to apply the network QoS described by the policy template to the application flow in the current network slice 402 by sending the policyTemplateId and M5QoSSpecification as described in clause 11.5 of 3GPP TS 26.501 at step 912.

When the 5GMS AF 410 concludes that the network QoS described by the requested policy template can be applied in the current network slice 402, the 5GMS AF 410 instantiates and applies the requested dynamic policy and returns back to the media session handler with a success response at step 914.

When the 5GMS AF 410 concludes that the network QoS described by the requested policy template cannot be satisfied in the current network slice 402, the 5GMS AF 410 denies instantiation of requested dynamic policy and returns back to the media session handler with a denied response at step 916. When the media session handler receives this response, steps 5-8 are repeated with the next applicable policy template.

Media streaming at reference point M4 (as specified in step 8 of clause 5.1 for downlink media streaming and step 8 of clause 6.1 for uplink media streaming in 3GPP TS 26.501) continues in the current network slice 402, with possible performance degradation if all applicable policy templates were exhausted without success at step 918.

Although FIG. 9 illustrates one example of a method 900 for dynamic policy invocation, various changes may be made to FIG. 9. For example, while shown as a series of steps, various steps in FIG. 9 may overlap, occur in parallel, or occur any number of times.

Figure 10:
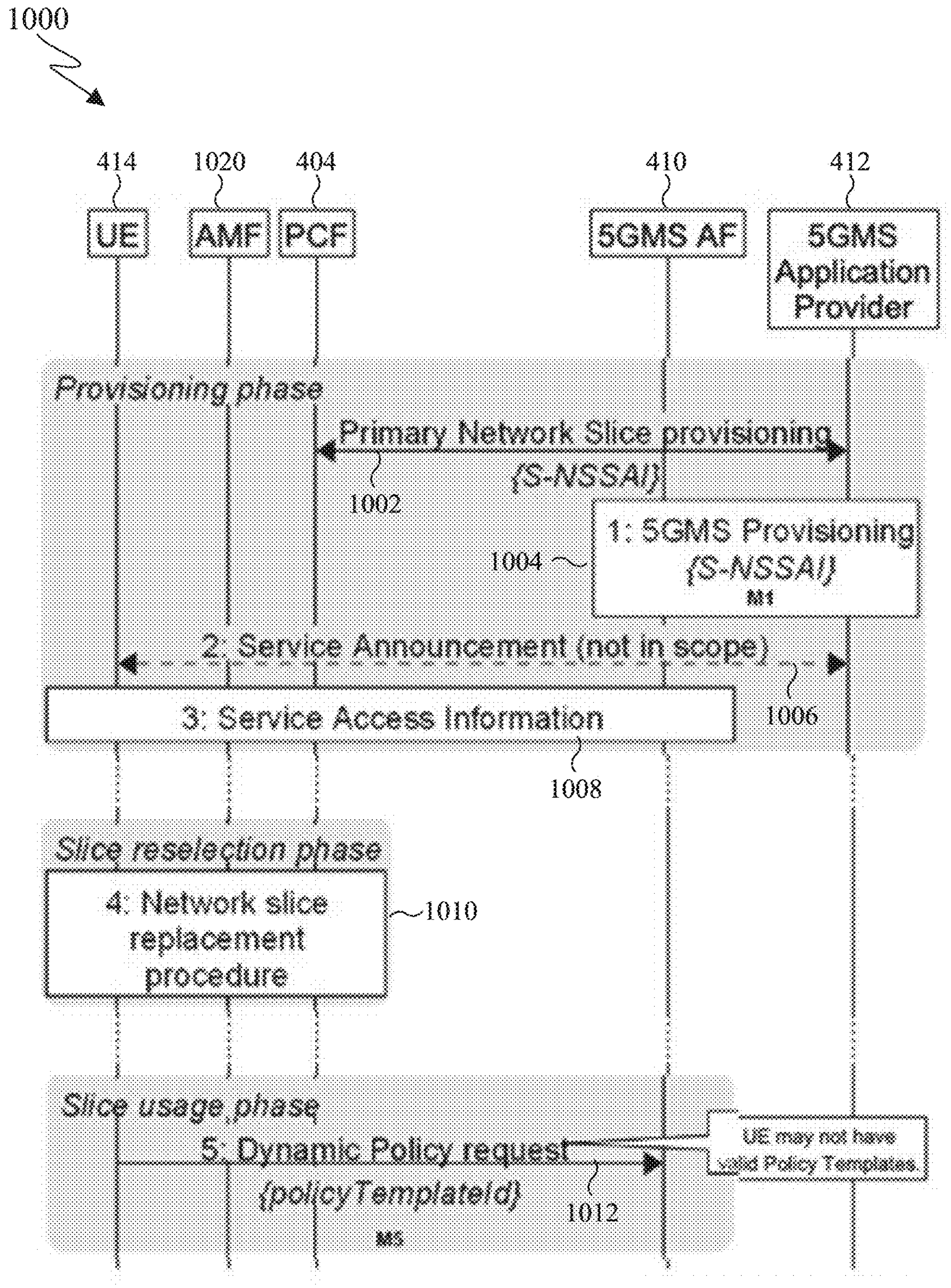
FIG. 10 illustrates an example method for impact on dynamic policy procedure when the ASP is not aware of the network slice replacement according to this disclosure.

FIG. 10 illustrates an example method 1000 for impact on dynamic policy procedure when the ASP 412 is not aware of the network slice replacement according to this disclosure. For ease of explanation, the method 1000 of FIG. 10 is described as being performed using the UE 414, the AF 410, and the ASP 412 of FIGS. 4A through 5, 7 through 10, and 14 through 20. However, the method 1000 may be used with any other suitable system and any other suitable electronic device.

As shown in FIG. 10, the primary network slice 402 is provisioned in the 5G system and the S-NSSAI for the primary network slice 402 is known to the 5GMS ASP 412 prior to 5GMS service provisioning at step 1002. The 5GMS ASP 412 performs service provisioning at the 5GMS AF 410 as described in clause 7 of TS 26.512 at step 1004.

The 5GMS ASP 412 provides the service announcement information to the 5GMS-aware application in the UE 414 at step 1006. The service announcement information includes either the whole service access information (i.e. details for media session handling at reference point M5d and for media streaming access at M4d) or a reference to the service access information. When the 5GMS client receives only a reference to the service access information, then it acquires the services access information from the 5GMS AF 410 at step 1008.

The network (AMF 1020 in this example call flow, but also possibly performed by the PCF 404, the NSSF 406, or the OAM 408) performs the network slice replacement procedure described in clause 5.15.19 of TS 23.501 at step 1010. The PCF 404 updates the UE route selection policy (URSP) rules with the alternative S-NSSAI information. TS 23.503 clause 6.6.2.2 describes the procedure about how the UE 414 is provisioned with URSP rules by the PCF 404. TS 23.503 clause 6.6.2.3 and clause 4.2.2 of present document describe the UE 414 procedure for associating applications with PDU sessions based on URSP. This step may involve creation of a new PDU session or modification of an existing PDU Session as specified in clause 4.2.2 of present document so the media session handler and media stream handler are able to reach the 5GMS AF 410 and 5GMS AS instances respectively via reference points M5 and M4.

The media session handler invokes the dynamic policy instantiation procedure on the 5GMS AF 410 for the application flow in the PDU session of the alternative S-NSSAI at step 1012. However, the media session handler may not have appropriate policy templates to request activation because of the reason that the 5GMS ASP 412 has not configured applicable policy templates for the alternative S-NSSAI.

Although FIG. 10 illustrates one example of a method 1000 for impact on dynamic policy procedure when the ASP 412 is not aware of the network slice replacement, various changes may be made to FIG. 10. For example, while shown as a series of steps, various steps in FIG. 10 may overlap, occur in parallel, or occur any number of times.

Figure 11:
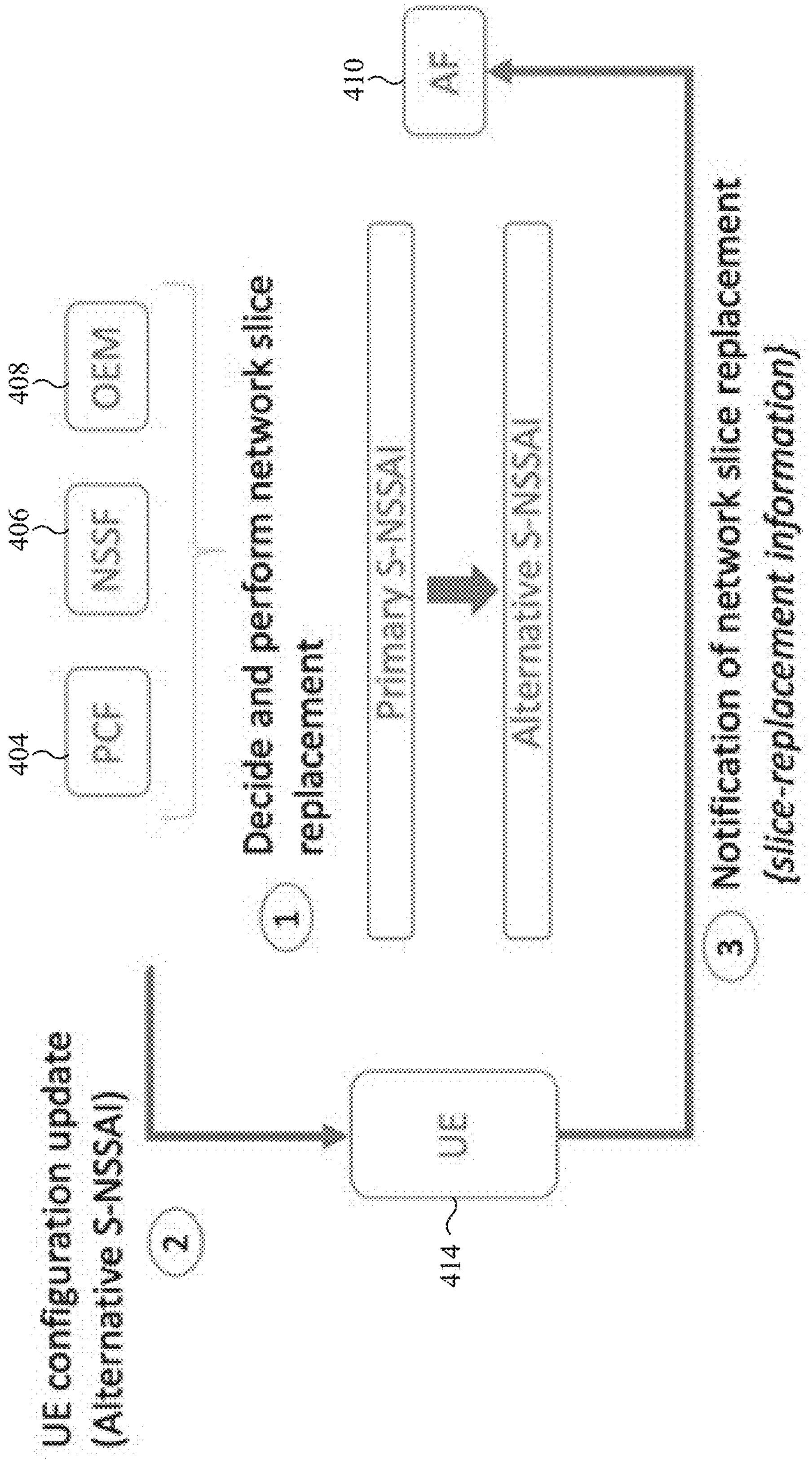
FIG. 11 illustrates an example system for user equipment (UE) notification to AF about network slice replacement in accordance with this disclosure.

FIG. 11 illustrates an example system 1100 for UE notification to AF 410 about network slice replacement in accordance with this disclosure. The embodiment of the system 1100 illustrated in FIG. 11 is for illustration only. FIG. 11 does not limit the scope of this disclosure to any particular implementation of an electronic device.

As shown in FIG. 11, the UE 414 is informed of alternative S-NSSAI either during the UE registration response, or prior to the network slice replacement procedure using a UE configuration update procedure according to clause 5.15.19 of TS 23501. When the UE 414 becomes aware of network's intention to perform network slice replacement, the UE MSH (media session handler specified in TS 26501) may inform the 5GMS AF 410 about network's intention of network slice replacement and may also include the alternative S-NSSAI information. Such a notification could be sent to the 5GMS AF 410 using M5 interactions described in TS 26512 as shown in FIG. 6 below.

When the 5GMS AF 410 receives the notification about network slice replacement from the UE 414, the 5GMS AF 410 becomes aware of network slice replacement and is in a position to provide appropriate services to the UE 414 in the new network slice 402. In the notification to the 5GMS AF 410, the UE MSH may include the below information in Table 5 as part of the network slice-replacement information to send to the 5GMS AF 410.

TABLE 5

| Information Element | Description |
| --- | --- |
| Alternative S-NSSAI | The network slice to which all the existing flows in primary S-NSSAI have to be switched to<br>The alternative S-NSSAI becomes the new network slice in which all the PDU sessions of the primary network slice will be setup (if not already available). All the application flows in the primary S-NSSAI will be migrated to the new alternative S-NSSAI |
| parameters-after-slice-replacement | Represents minimum requirements for different network slice and service parameters that the UE intends to have after network slice replacement. Possible values include:<br>Downlink throughput per UE: Min/max/avg. downlink throughput per UE in the network slice that the UE is able to adopt after network slice replacement<br>Uplink throughput per UE: Min/max/avg. uplink throughput per UE in the network slice that the UE is able to adopt after network slice replacement<br>E2e latency: Min/max/avg. e2e latency that the UE is able to adopt after network slice replacement<br>Downlink Bitrate: Max/avg./min downlink bitrate that the UE is able to adopt after network slice replacement<br>Uplink Bitrate: Max/avg./min uplink bitrate that the UE is able to adopt after network slice replacement<br>Downlink Bandwidth: Max/avg./min downlink bandwidth that the UE is able to adopt after network slice replacement<br>Uplink Bandwidth: Max/avg./min uplink bandwidth that the UE is able to adopt after network slice replacement<br>Downlink Loss rate: Max/avg./min downlink loss rate that the UE is able to adopt after network slice replacement<br>Uplink Loss rate: Max/avg./min uplink loss rate that the UE is able to adopt after network slice replacement |
| parameters-to-avoid-slice-replacement | Represents the drop-off in network slice and service parameter requirements that the UE is willing to undertake to avoid network slice replacement. This constitutes the UE's offer to reduce its demand for network slice/service parameters. Possible values include:<br>Downlink throughput per UE: Min/max/avg. downlink throughput per UE in the network slice<br>Uplink throughput per UE: Min/max/avg. uplink throughput per UE in the network slice<br>E2e latency: Min/max/avg. e2e latency<br>Downlink Bitrate: Max/avg./min downlink bitrate<br>Uplink Bitrate: Max/avg./min uplink bitrate<br>Downlink Bandwidth: Max/avg./min downlink bandwidth<br>Uplink Bandwidth: Max/avg./min uplink bandwidth<br>Downlink Loss rate: Max/avg./min downlink loss rate<br>Uplink Loss rate: Max/avg./min uplink loss rate |
| Temporary-reduction-time | Amount of time the UE is willing to reduce the service quality for network slice replacement procedures before rolling back requirements to original values |

Although FIG. 11 illustrates an example system 1100 for UE notification to AF 410 about network slice replacement, various changes may be made to FIG. 11. For example, the number and placement of various components of the system 1100 can vary as needed or desired. In addition, the system 1100 may be used in any other suitable multimedia process and is not limited to the specific processes described above.

Figure 12:
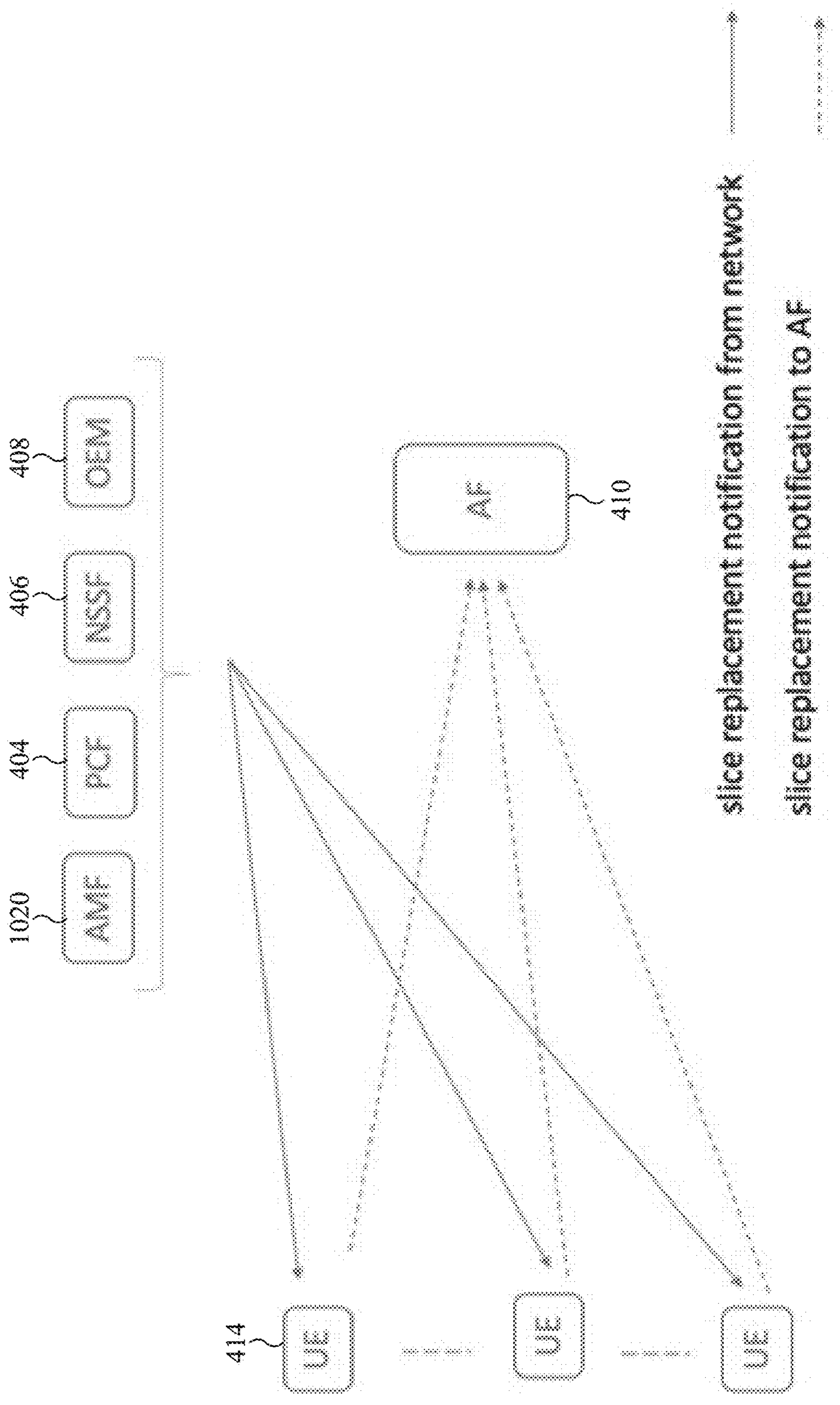
FIG. 12 illustrates an example system for UE notification to the AF about network slice replacement in accordance with this disclosure.

FIG. 12 illustrates an example system 1200 for UE notification to the AF 410 about network slice replacement in accordance with this disclosure. The embodiment of the system 1200 illustrated in FIG. 12 is for illustration only. FIG. 12 does not limit the scope of this disclosure to any particular implementation of an electronic device.

When one or more UEs 414, receiving a service within a primary network slice 402, receive a notification from the network that the primary network slice 402 is being replaced with an alternative network slice 402 (alternative S-NSSAI, each UE 414 may send network slice replacement notification as described above to the 5GMS AF 410.

As shown in FIG. 12, all the UEs 414 that have received notification from the network about replacement of a primary network slice 402 with an alternative network slice 402 (or S-NSSAI), each UE 414 sends a notification to the AF 410 about network slice replacement. Such a notification from each UE 414 includes the network slice replacement information with respect to that UE 414 as described in Table 5.

When the AF 410 receives the notification from one or more UEs 414 with network slice replacement information, the AF 410 may perform the following actions. For example, when a sufficient number of UEs 414 send network slice replacement information with "parameters-to-avoid-slice-replacement" indicating reduction of their service/slice quality demands, the AF 410 checks to see if the primary network slice 402 can continue to provide service to all the UEs 414 with the reduced demand. If AF 410 infers that the service can continue in the primary network slice 402, the AF 410 performs the following sub actions. The AF 410 informs the network QoS entities (PCF 404, AMF 1020, NSSF 406) of updated QoS requirements on the primary network slice 402. Using this new information, the network entities may cancel the plan for network slice replacement and continue the service in the primary network slice 402.

Network entities send UE 414 configuration update message to roll back the network slice replacement possibility.

Another action the AF 410 can perform includes, based on "parameters-to-avoid-slice-replacement" information in the network slice replacement information from all the UEs 414, the AF 410 may infer that the primary network slice 402 may not be able to accommodate all the UEs 414 even with their reduced demands. In this case, network slice replacement may proceed as intended by the network entities.

Another action the AF 410 can perform includes, when few UEs 414 send a notification to the AF 410 with network slice replacement information, the AF 410 may setup a simple broadcast/multicast session and send a message to all the subscribed UEs 414, or a set of UEs 414 based on a user list received from the ASP 412 (information element "UE-list-for-slice-replacement" in Table 6). In the broadcast/multicast message, the AF 410 may inform the set of UEs 414 that the current primary network slice 402 is up for replacement. When the broadcast/multicast set of UEs 414 receive a message from AF 410 about impending network slice replacement, each UE 414 may respond to the AF 410 with the network slice replacement information described in Table 5 above. Based on network slice replacement information from this broadcast/multicast set of UEs 414, along with the UEs 414 that initially reached out the AF 410 with network slice replacement information, the AF 410 may infer whether the updated demands from the UEs 414 may avoid network slice replacement as described earlier.

An additional action the AF 410 can perform includes, if the ASP 412 does not configure "UE-list-for-slice-replacement" at the 5GMS AF 410, the 5GMS AF 410 may randomly select a set of UEs 414 to send the broadcast/multicast message. When those selected UEs 414 receive the message, they send the network slice replacement information as described earlier in the disclosure.

Another action the AF 410 can perform includes, when notification for network slice replacement from one or more UEs 414 include the "temporary-reduction-time" timing information, the AF 410 checks to see if this value is higher than the anticipated network slice-replacement period (e.g., based on network analytics information, or information from other 5G network entities). network slice-replacement-period is the time period for which the alternative S-NSSAI is to be used before reverting back to the primary S-NSSAI (e.g., time required to clear congestion in primary network slice 402 before it is put back for operation). If the timing information from the UE "temporary-reduction-time" is higher than network slice-replacement-period, then this means that the UE 414 may go down on demands for a time period higher than the time it takes to bring back the primary network slice 402 into operation. In this case, it is highly likely that the primary network slice 402 is back in operation and serves the UE 414 for quality requirements as initially requested. In this case, the AF 410 may not consider reduced demands from the UE 414 in the operations to avoid network slice replacement described earlier in the disclosure as the effect of network slice replacement is minimal to the UE 414. Alternatively, if the "temporary-reduction-time" is lower than the anticipated network slice-replacement-period, then this means that the UE 414 needs to revert back to original service requirements before primary network slice 402 is back in operation.

Another action the AF 410 can perform includes the 5GMS AF 410 may assign 'lower' scores for UEs 414 with higher "temporary-reduction-time" than the UEs 414 with lower "temporary-reduction-time" to infer a cumulative score whether or not to request stopping network slice replacement procedure. This means that more weightage is given to UEs 414 that are unable to provide higher wait times for AF 410 to request cancellation of network slice replacement tasks to the 5G network entities.

Although FIG. 12 illustrates an example system 1200 for UE notification to the AF 410 about network slice replacement, various changes may be made to FIG. 12. For example, the number and placement of various components of the system 1200 can vary as needed or desired. In addition, the system 1200 may be used in any other suitable multimedia process and is not limited to the specific processes described above.

Figure 13:
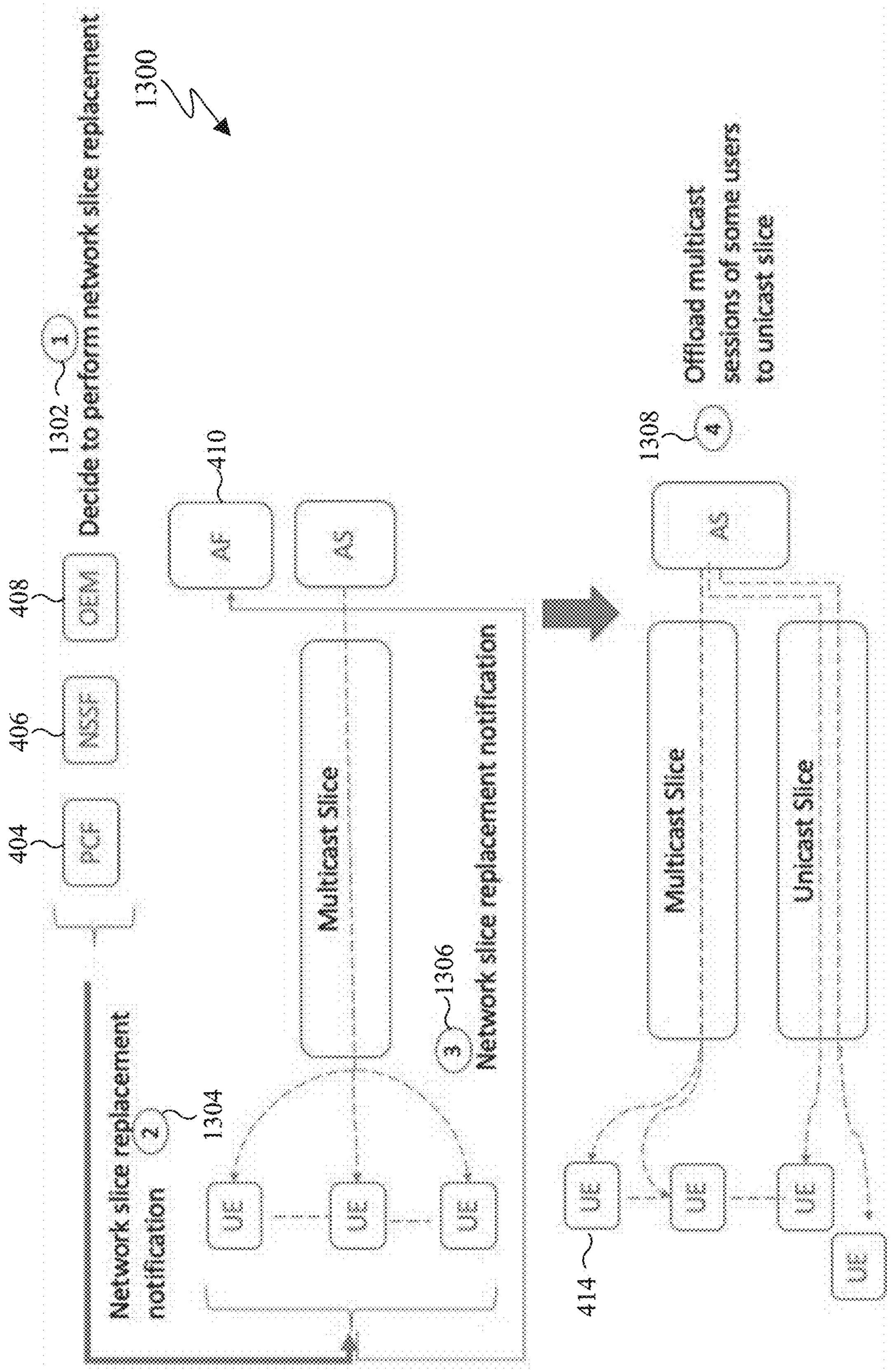
FIG. 13 illustrates an example system for offloading multicast sessions of some users during network slice replacement in accordance with this disclosure.

FIG. 13 illustrates an example system 1300 for offloading multicast sessions of some users during network slice replacement in accordance with this disclosure. The embodiment of the system 1300 illustrated in FIG. 13 is for illustration only. FIG. 13 does not limit the scope of this disclosure to any particular implementation of an electronic device.

As shown in FIG. 13, It is possible that the network entities decide to replace a network slice 402 that is carrying multicast traffic with an alternate network slice 402. Since the alternate network slice 402 does not guarantee similar performance as that of the original network slice 402, it may be useful to have mechanisms in place to provide some enhancements to cater to multicast users. Specifically, the alternate network slice 402 may perform reasonably well with reduced multicast/broadcast user group.

To help an alternate network slice 402 perform as required by the service level agreements, the number of multicast users may be reduced during network slice replacement procedures so the alternate network slice 402, with limited capabilities, may be sufficient for multicast sessions. The users who were taken out of the multicast session may be served with unicast sessions. To facilitate such multicast user group reduction, the AF 410 may prepare the following information.

The AF 410 can prepare an offload-multicast-user-list. The offload-multicast-user-list includes a list of users who may be removed from the multicast group during network slice replacement procedures so the alternate network slice 402 may be enough for continuing multicast sessions.

The AF 410 can also prepare percentage-of-users-for-multicast-offloading information. Depending on available network analytics and network slice analytics information, the AF 410 may determine the percentage number of users whose membership in the multicast group is to be removed during network slice replacement procedures. The AF 410 picks the users whose membership is to be removed based on criteria such as form factor and end user capabilities of the user devices and subscription. The Form factor and end user capabilities of the user devices can include, for example, user devices with certain type of limitations or restrictions may be considered for removal (e.g., devices with limited resolutions). The subscription can include users with least subscription levels may be picked for removal.

As shown in FIG. 13, the offloading of certain multicast user sessions to unicast may happen as described in the following steps. The network entities can decide to replace primary network slice 402 with an alternative network slice 402 as described in TS 23501 decide in step 1302. The network entities notify the UE 414 about network slice replacement in step 1304. The UE 414 (or the MSH inside the UE 414 described in TS 26501 and TS 26512) inform the AF 410 about network slice replacement by the network entities in step 1306. The AF 410 prepares to offload certain user sessions from multicast to unicast as described in this disclosure so alternate network slice 402 is suitable for continuing multicast for other users in step 1308.

The ASP 412 may provide service configuration information to the 5GMS AF 410 to help with managing network slice replacement notifications from the UEs 414. Examples of information elements can be found in Table 6.

TABLE 6

| Information Element | Description |
|---|---|
| UE-list-for-slice-replacement | List of UEs to which the AF may send broadcast/multicast message to check whether they are able to temporarily reduce their demands to avoid network slice replacement |
| periodic-time-interval | The time interval after which the UE sends updated network slice replacement information to the AF using the notification described earlier in the disclosure. |

Although FIG. 13 illustrates an example system 1300 for offloading multicast sessions of some users during network slice replacement, various changes may be made to FIG. 13. For example, the number and placement of various components of the system 1300 can vary as needed or desired. In addition, the system 1300 may be used in any other suitable multimedia process and is not limited to the specific processes described above.

Figure 14:
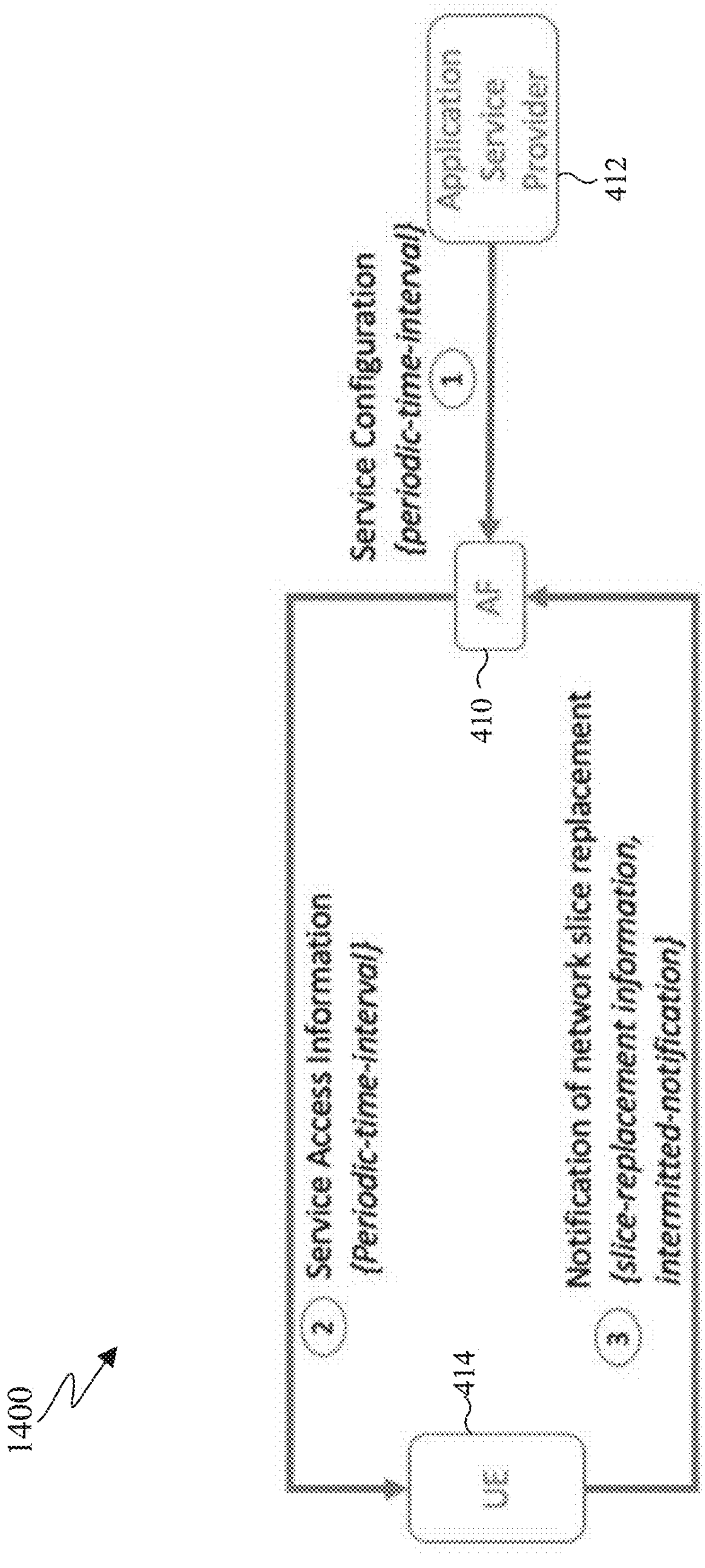
FIG. 14 illustrates an example system for proactive notification to the AF about network slice replacement in accordance with this disclosure.

FIG. 14 illustrates an example system 1400 for proactive notification to the AF 410 about network slice replacement in accordance with this disclosure. The embodiment of the system 1400 illustrated in FIG. 14 is for illustration only. FIG. 14 does not limit the scope of this disclosure to any particular implementation of an electronic device.

As shown in FIG. 14, the UEs 414 send out this notification to the 5GMS AF 410 periodically even without an explicit notification from the network entities such as the AMF 1020, the PCF 404, the NSSF 406, the OEM 408, etc. To support this intermittent notification mechanism, the ASP 412 may during service configuration stage, configure the periodic-time-interval for network slice replacement information notification from the UE 414 to the AF 410.

The M1 service provisioning APIs described in TS 26501 and TS 26512 may be used for service configuration at the 5GMS AF 410. When the AF 410 receives this information as part of the M1 provisioning API, makes available the periodic-time-interval to the MSH inside the UEs 414 using the M5 service access information API specified in TS 26501 and TS 26512. When the UE 414 receives this information, it sends a notification to the 5GMS AF 410 about network slice replacement with network slice replacement information described earlier in the disclosure. Such a notification is sent to the AF 410 periodically, every "periodic-time-interval" time units.

However, to differentiate that this notification is not as a result of notification from 5G entities about network slice replacement, the UEs 414 may include an information element "intermittent-notification" and set the value of this element to "true". When the AF 410 receives a notification with this information element, infers that this notification is not because of an impending network slice replacement event, but a periodic notification from the UE 414 about network slice replacement.

The AF 410, after receiving notifications from some UEs 414, may perform the broadcast/multicast notification to check if some of them may reduce their demands to potentially avoid any network slice replacement tasks by the network.

Although FIG. 14 illustrates an example system 1400 for proactive notification to the AF 410 about network slice replacement, various changes may be made to FIG. 14. For example, the number and placement of various components of the system 1400 can vary as needed or desired. In addition, the system 1400 may be used in any other suitable multimedia process and is not limited to the specific processes described above.

Figure 15A:
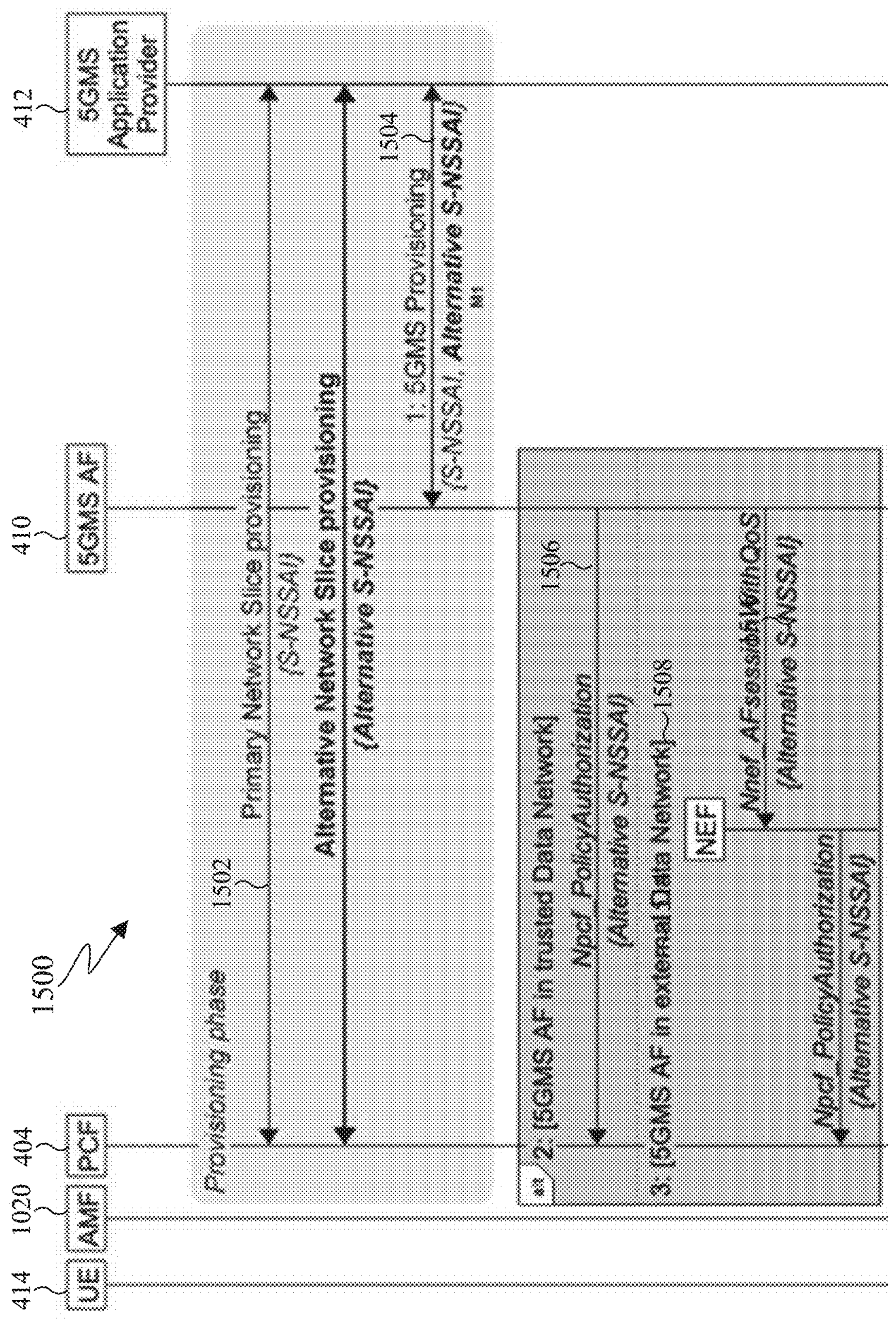
FIGS. 15A and 15B illustrate an example method for configuration of policy templates for alternate single network slice selection assistance information (S-NSSAI) in case of network slice replacement according to this disclosure.
Figure 15B:
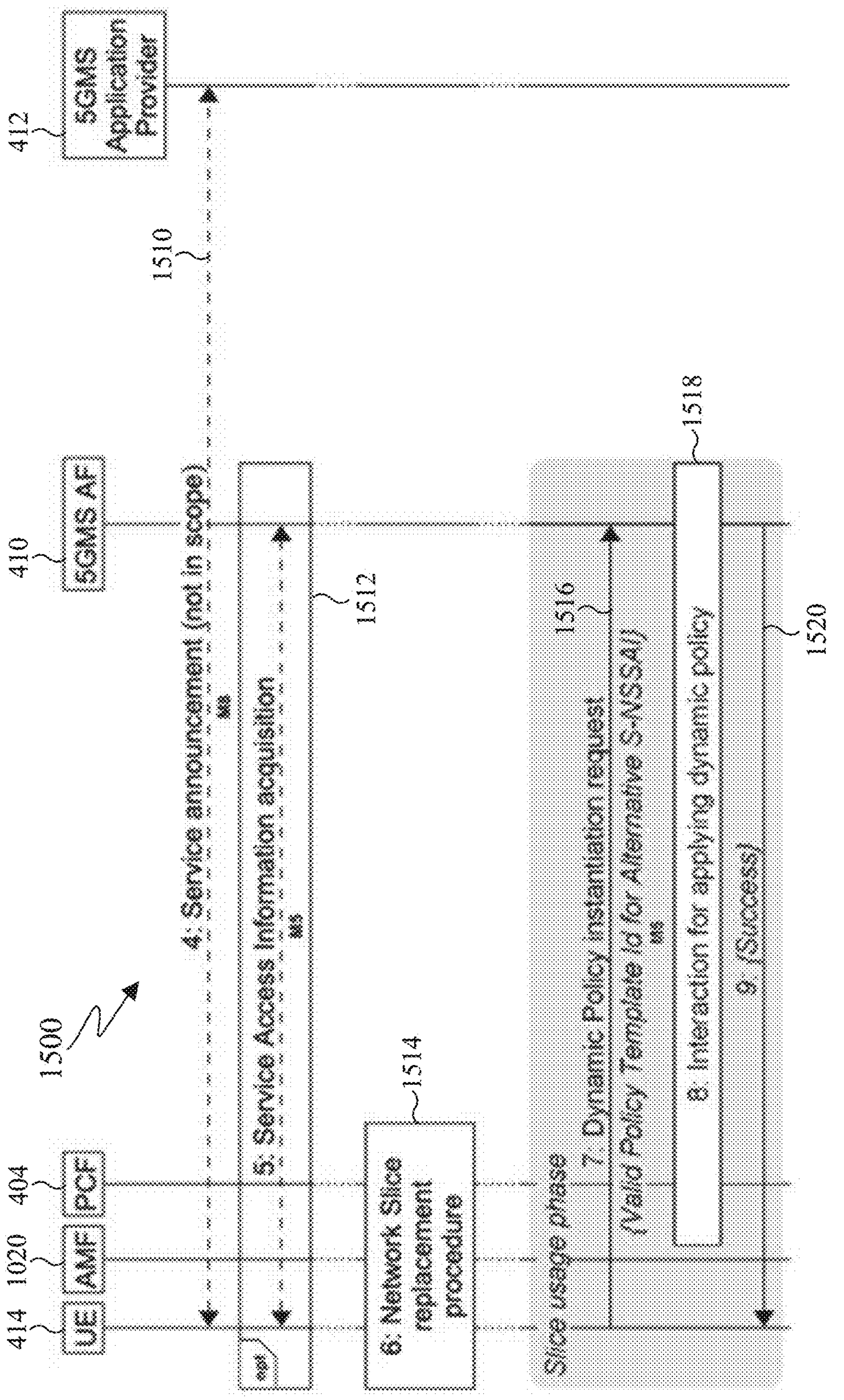

FIGS. 15A and 15B illustrate an example method 1500 for configuration of policy templates for alternate S-NSSAI in case of network slice replacement according to this disclosure. For ease of explanation, the method 1500 of FIGS. 15A and 15B are described as being performed using the UE 414, the AF 410, and the ASP 412 of FIGS. 4A through 5, 7 through 10, and 14 through 20. However, the method 1500 may be used with any other suitable system and any other suitable electronic device.

This candidate solution studies the impact of network slice replacement on 5GMS procedures as described in the description of this key issue and also as specified in clause 5.15.19 of TS 23.501. Specifically, the impact of network slice replacement is examined in relation to the dynamic policy invocation procedure specified in clause 4.7.3 of TS 26.512 in the case where policy templates applicable to an alternative network slice 402 are provisioned in the 5GMS AF 410 before a network slice replacement procedure is invoked.

An assumption includes that there is no change in the DN because of the network slice replacement procedure, i.e., the same DN is accessible from both the primary network slice 402 and the alternative network slice 402. Another assumption made includes that the 5GMS AF 410 instance accessed by the media session handler through the primary network slice 402 is also accessible through the alternative network slice 402 at reference point M5. There is no change in the IP address of the 5GMS AF 410 instance. An additional assumption includes that the 5GMS AS instance accessed by the media stream handler through the primary network slice 402 is accessible through the alternative network slice 402 at reference point M4. There is no change in the IP address of the 5GMS AS instance.

As shown in FIG. 15A, the impact on M5 dynamic policy procedure when the network decides to replace the primary S-NSSAI with an alternative S-NSSAI as specified in clause 5.15.19 of TS 23.501, and the 5GMS ASP 412 is aware of network slice replacement. This applies in the case where OAM configures the alternative S-NSSAI information and the 5GMS ASP 412 is aware of the Alternative S-NSSAI e.g., communicated through the OAM.

The primary network slice 402 and alternative network slice 402 are provisioned in the 5G System and the S-NSSAIs for both of these are known to the 5GMS ASP 412 prior to 5GMS service provisioning at step 1502.

The 5GMS ASP 412 performs service provisioning with the 5GMS AF 410 at reference point M1 as described in clause 7 of TS 26.512 at step 1504. The provisioning information from the 5GMS ASP 412 includes a policy template citing an alternative S-NSSAI in addition to a primary S-NSSAI in order to support the network slice replacement procedure. The DNN for both network slices 402 is the same. The provisioning procedure in this step corresponds to either the initial M1 service provisioning request or an update of an existing provisioning service resource. It is up to the 5GMS ASP 412 whether matching policy templates are provisioned across both the primary S-NSSAI and the alternative S-NSSAI.

If the 5GMS AF 410 is in the trusted DN, it interacts directly with the PCF 404, using the Npcf_PolicyAuthorization service as defined in clause 5.2.5.3 of TS 23.502, to create an appropriate application session context in the PCF 404 with the alternative S-NSSAI information at step 1506. The data model for ApplicationSessionContext is specified in clause 5.6.2.2 of TS 29.514.

If the 5GMS AF 410 is in the external DN, it may use the Nnef_AFsessionWithQos service as defined in clause 5.2.6.9 of TS 23.502 to configure the alternative S-NSSAI information at step 1508. The NEF may invoke the Npcf_PolicyAuthorization service on behalf of the 5GMS AF 410 to create an appropriate session context in the PCF 404 with the provided alternative S-NSSAI information. The data model for ApplicationSessionContext is specified in clause 5.6.2.2 of TS 29.514.

As shown in FIG. 15B, the 5GMS ASP 412 announces the 5GMS service to the 5GMS-aware application running in the UE 414 at step 1510. The service announcement includes either the whole service access information (i.e. details for media session handling at reference point M5d and for media streaming access at M4d) or a reference to the full service access information.

In case the 5GMS client received only a reference to the service access information in the previous step, it acquires the services access information from the 5GMS AF 410 via reference point M5 at step 1512.

The network (PCF 404 in this example call flow, but also possibly performed by AMF 1020, the NSSF 406, or the OEM 408) initiates the network slice replacement procedure described in clause 5.15.19 of TS 23.501 at step 1514. The PCF 404 updates the URSP rules with the alternative S-NSSAI information. TS 23.503 clause 6.6.2.2 describes the procedure about how the UE 414 is provisioned with URSP rules by the PCF 404. TS 23.503 clause 6.6.2.3 and clause 4.2.2 of present document describe the UE procedure for associating applications with PDU sessions based on URSP. This step may involve creation of a new PDU session or modification of an existing PDU session as specified in clause 4.2.2 of TR 26.941 so the media session handler and media stream handler reach the 5GMS AF 410 and 5GMS AS instances via reference points M5 and M4 respectively. After step 1514, for any subsequent 5G media streaming API requests over M5 reference points that require 5GMS AF 410 interaction with PCF 404 and/or NEF for use with the PDU Session in alternative S-NSSAI, appropriate application session context is available at the PCF 404 for any application-related processing.

The media session handler invokes the M5 dynamic policy API with a valid policyTemplateId that is applicable for the provisioned alternative S-NSSAI, according to clause 11.5 of TS 26.512 at step 1516. The 5GMS AF 410 interacts with PCF 404 to request necessary actions to apply the requested dynamic policy at step 1518. The 5GMS AF 410 responds to the 5GMS client that the requested dynamic policy has successfully been applied at step 1518.

Although FIGS. 15A and 15B illustrate one example of a method 1500 for configuration of policy templates for alternate S-NSSAI in case of network slice replacement, various changes may be made to FIGS. 15A and 15B. For example, while shown as a series of steps, various steps in FIGS. 15A and 15B may overlap, occur in parallel, or occur any number of times.

Figure 16A:
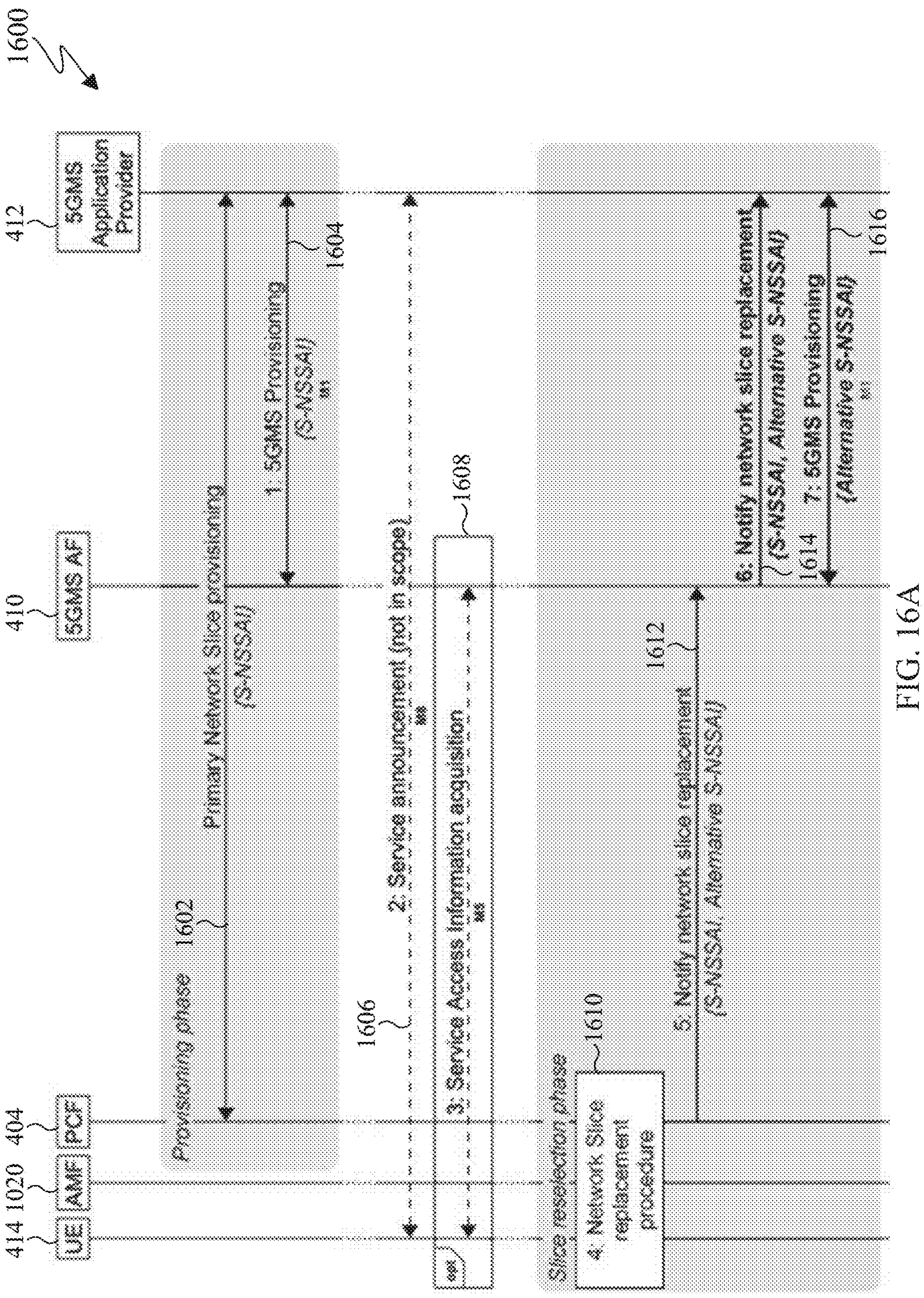
FIGS. 16A and 16B illustrate an example method for configuration of policy templates citing alternative S-NSSAI after network slice replacement according to this disclosure.
Figure 16B:
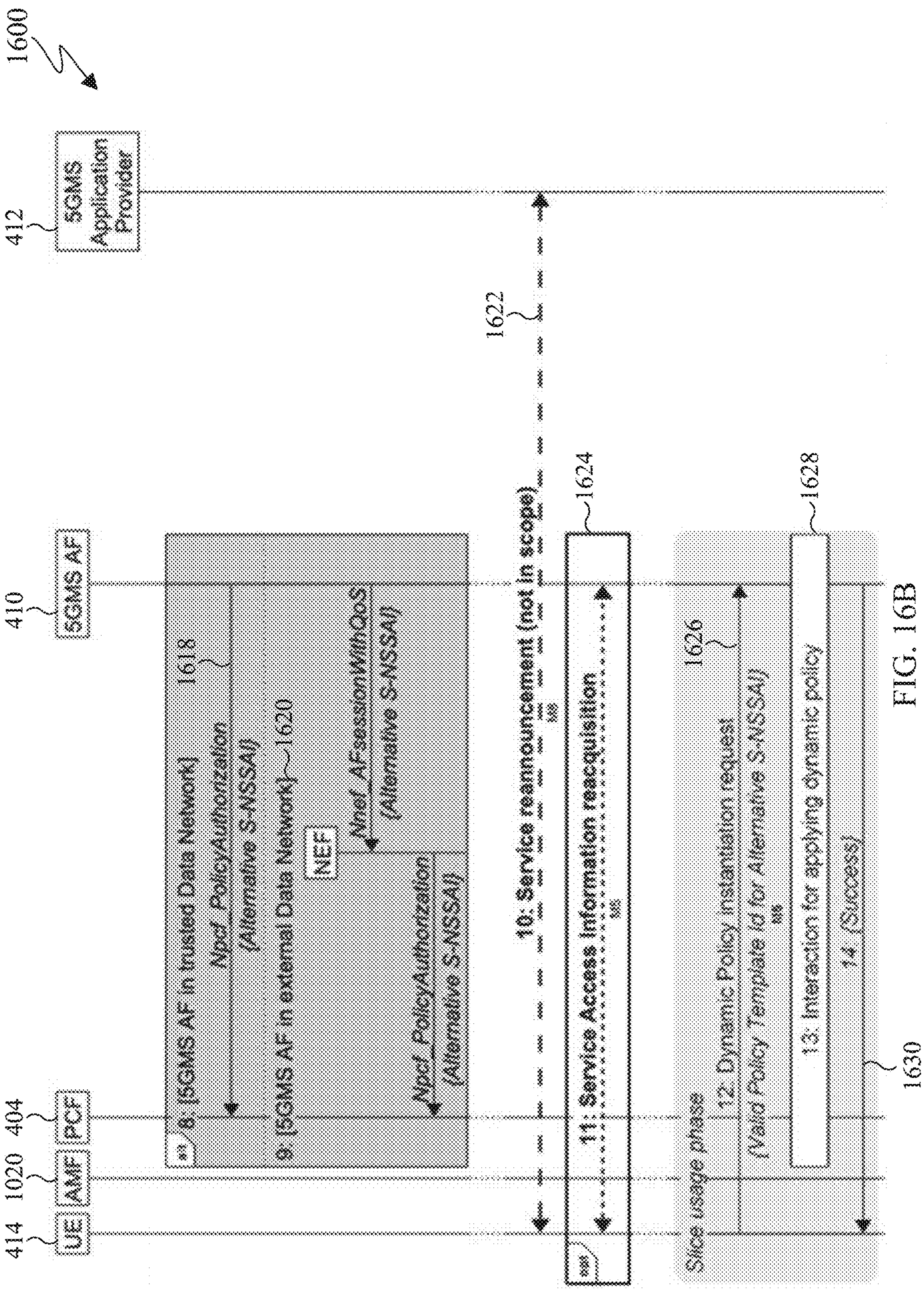

FIGS. 16A and 16B illustrates an example method 1600 for configuration of policy templates citing alternative S-NSSAI after network slice replacement according to this disclosure. For ease of explanation, the method 1600 of FIGS. 16A and 16B are described as being performed using the UE 414, the AF 410, and the ASP 412 of FIGS. 4A through 5, 7 through 10, and 14 through 20. However, the method 1600 may be used with any other suitable system and any other suitable electronic devices.

This candidate solution studies the impact of network slice replacement on 5GMS procedures because as described in the description of this key issue and also as specified in clause 5.15.19 of TS 23.501. Specifically, the impact of network slice replacement is examined in relation to the dynamic policy invocation procedure specified in clause 4.7.3 of TS 26.512 in the case where policy templates applicable to an alternative network slice 402 are provisioned in the 5GMS AF 410 after a network slice replacement procedure is invoked.

An assumption includes that there is no change in the DN because of the network slice replacement procedure, i.e., the same DN is accessible from both the primary network slice 402 and the alternative network slice 402. This corresponds to example data network DNB in FIG. 4.2.1-1 of TR 26.941 which mapped into both network slice instance X and network slice instance Y. Another assumption includes that the 5GMS AF 410 instance accessed by the media session handler through the primary network slice 402 is also accessible through the alternative network slice 402 at reference point M5. There is no change in the IP address of the 5GMS AF 410 instance. An additional assumption includes that the 5GMS AS instance accessed by the media stream handler through the primary network slice 402 is accessible through the alternative network slice 402 at reference point M4. There is no change in the IP address of the 5GMS AS instance.

FIGS. 16A and 16B illustrates the impact on the M5 dynamic policy procedure when the network decides to replace the primary network slice 402 with an alternative network slice 402 as specified in clause 5.15.19 of TS 23.501, and the 5GMS ASP 412 is made aware of the network slice replacement after the fact.

As shown in FIG. 16A, The primary network slice 402 is provisioned in the 5G System and the S-NSSAI for the primary network slice 402 is known to the 5GMS ASP 412 prior to 5GMS service provisioning at step 1602. The 5GMS ASP 412 performs service provisioning with the 5GMS AF 410 at reference point M1 as specified in clause 7 of TS 26.512 at step 1604.

The 5GMS ASP 412 announces the 5GMS service to the 5GMS-aware application running in the UE 414 at step 1606. The service announcement includes either the whole service access information (i.e. details for media session handling at reference point M5d and for media streaming access at M4d) or a reference to the full service access information.

In case the 5GMS Client received only a reference to the service access information, it acquires the services access information from the 5GMS AF 410 via reference point M5 at step 1608. The network (PCF 404 in this example call flow, but also possibly performed by AMF 1020, the NSSF 406, or the OEM 408) performs the network slice replacement procedure described in clause 5.15.19 of TS 23.501 at step 1610. The PCF 404 updates the URSP rules with the alternative S-NSSAI information. TS 23.503 clause 6.6.2.2 describes the procedure about how the UE 414 is provisioned with URSP rules by the PCF 404. TS 23.503 clause 6.6.2.3 and clause 4.2.2 of TR 26.941 describe the UE procedure for associating applications with PDU sessions based on URSP. This step may involve creation of a new PDU session or modification of an existing PDU session as specified in clause 4.2.2 of TR 26.941 so the media session handler and media stream handler reach the 5GMS AF 410 and 5GMS AS instances via reference points M5 and M4 respectively.

The PCF 404 notifies the 5GMS AF 410 about network slice replacement, and includes the alternative S-NSSAI information at step 1612. The 5GMS AF 410 notifies the 5GMS ASP 412 about network slice replacement, and includes the alternative S-NSSAI information at step 1614. The 5GMS ASP 412 updates the service provisioning information at the 5GMS AF 410 with policy templates citing alternative S-NSSAI as described in clause 7 of TS 26.512 at step 1616.

If the 5GMS AF 410 is in the trusted DN, it interacts directly with the PCF 404, using the Npcf_PolicyAuthorization service as defined in clause 5.2.5.3 of TS 23.502, to create an appropriate application session context in the PCF 404 with the alternative S-NSSAI information at step 1618. The data model for ApplicationSessionContext is specified in clause 5.6.2.2 of TS 29.514.

Alternatively, if the 5GMS AF 410 is in the external DN, it may use the Nnef_AFsessionWithQoS service as defined in clause 5.2.6.9 of TS 23.502 to configure the alternative S-NSSAI information at step 1620. The NEF may invoke the Npcf_PolicyAuthorization service on behalf of the 5GMS AF 410 to create an appropriate session context in the PCF 404 with the provided alternative S-NSSAI information. The data model for ApplicationSessionContext is specified in clause 5.6.2.2 of TS 29.514.

The 5GMS ASP 412 may reannounce the 5GMS service to the 5GMS-aware application in the UE 414 at step 1622. In case the 5GMS client received only a reference to the Service Access Information in the previous step, it reacquires the services access information from the 5GMS AF 410 via reference point M5 at step 1624. The media session handler invokes the M5 dynamic policy API with a valid policyTemplateId that is applicable for the provisioned alternative S-NSSAI, according to clause 11.5 of TS 26.512 at step 1626. The 5GMS AF 410 interacts with PCF 404 to request necessary actions to apply the requested dynamic policy as described in clause 5.7.1 of TS 26.501 at step 1628. The 5GMS AF 410 responds to the 5GMS client that the requested dynamic policy request is successful at step 1630.

Although FIGS. 16A and 16B illustrate one example of a method 1600 for configuration of policy templates citing alternative S-NSSAI after network slice replacement, various changes may be made to FIGS. 16A and 16B. For example, while shown as a series of steps, various steps in FIGS. 16A and 16B may overlap, occur in parallel, or occur any number of times.

Figure 17:
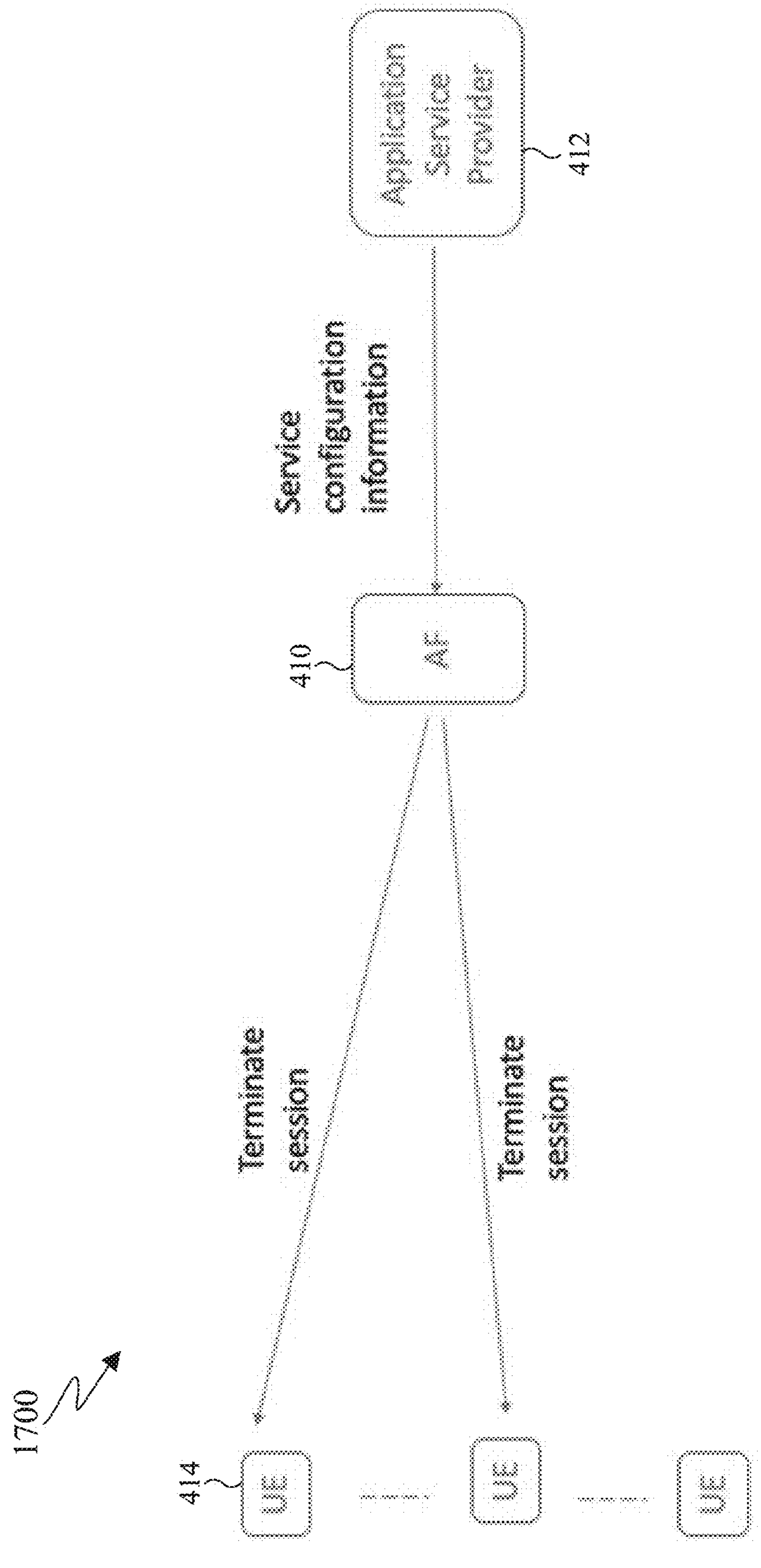
FIG. 17 illustrates an example system for service configuration to facilitate session termination of some users to avoid network slice replacement in accordance with this disclosure

FIG. 17 illustrates an example system 1700 for service configuration to facilitate session termination of some users to avoid network slice replacement in accordance with this disclosure. The embodiment of the system 1700 illustrated in FIG. 17 is for illustration only. FIG. 17 does not limit the scope of this disclosure to any particular implementation of an electronic device.

As shown in FIG. 17, the ASP 412 may not prefer the primary network slice 402 to be replaced with a different alternative network slice 402. Towards this, the ASP 412 may be inclined to terminate some user sessions so network slice replacement procedures can be avoided.

To facilitate such user management for a service, the ASP 412 may configure a UE-terminate list and a percentage-of-users-to-be-terminated information at the 5GMS AF 410, e.g., using the M1 service provisioning API specified in TS 26501 and TS 26512.

The UE-terminate-list can include a list of users whose sessions may be terminated to avoid network slice replacement i.e., avoid replacing primary network slice 402 with an alternative network slice 402. When the AF 410 receives such information from the ASP 412, constantly waits to receive network slice replacement notification from the UEs 414. When one or more UEs 414 send notification to the AF 410 about network slice replacement they heard from network entities, the AFs 410 can attempt to terminate sessions of the users in this list, and then request 5G network entities (e.g., PCF 404, AMF 1020, SMF) to re-evaluate necessity for network slice replacement. It is possible that once the sessions of the users in this list are terminated, the network finds that the network slice replacement procedure is not necessary anymore. To help bring these users back into the service, the ASP 412 may also configure a "wait-period" after which the UEs 414 may retry joining the service. Such information can be delivered to the UE 414 using the M8 interface or the M5 service access information API specified in TS 26501 or TS 26512 either during the initial session setup stage, or subsequently during the middle of the session.

The percentage-of-users-to-be-terminated information can include, instead of a user list, a percentage of users whose sessions is to be terminated. When the AF 410 receives this information from the ASP 412, it may, using a random methodology, or based on a preferential treatment methodology, select a list of users whose sessions are to be terminated. Once the list of users is prepared, their sessions are terminated.

Although FIG. 17 illustrates an example system 1700 for service configuration to facilitate session termination of some users to avoid network slice replacement, various changes may be made to FIG. 17. For example, the number and placement of various components of the system 1700 can vary as needed or desired. In addition, the system 1700 may be used in any other suitable multimedia process and is not limited to the specific processes described above.

Figure 18:
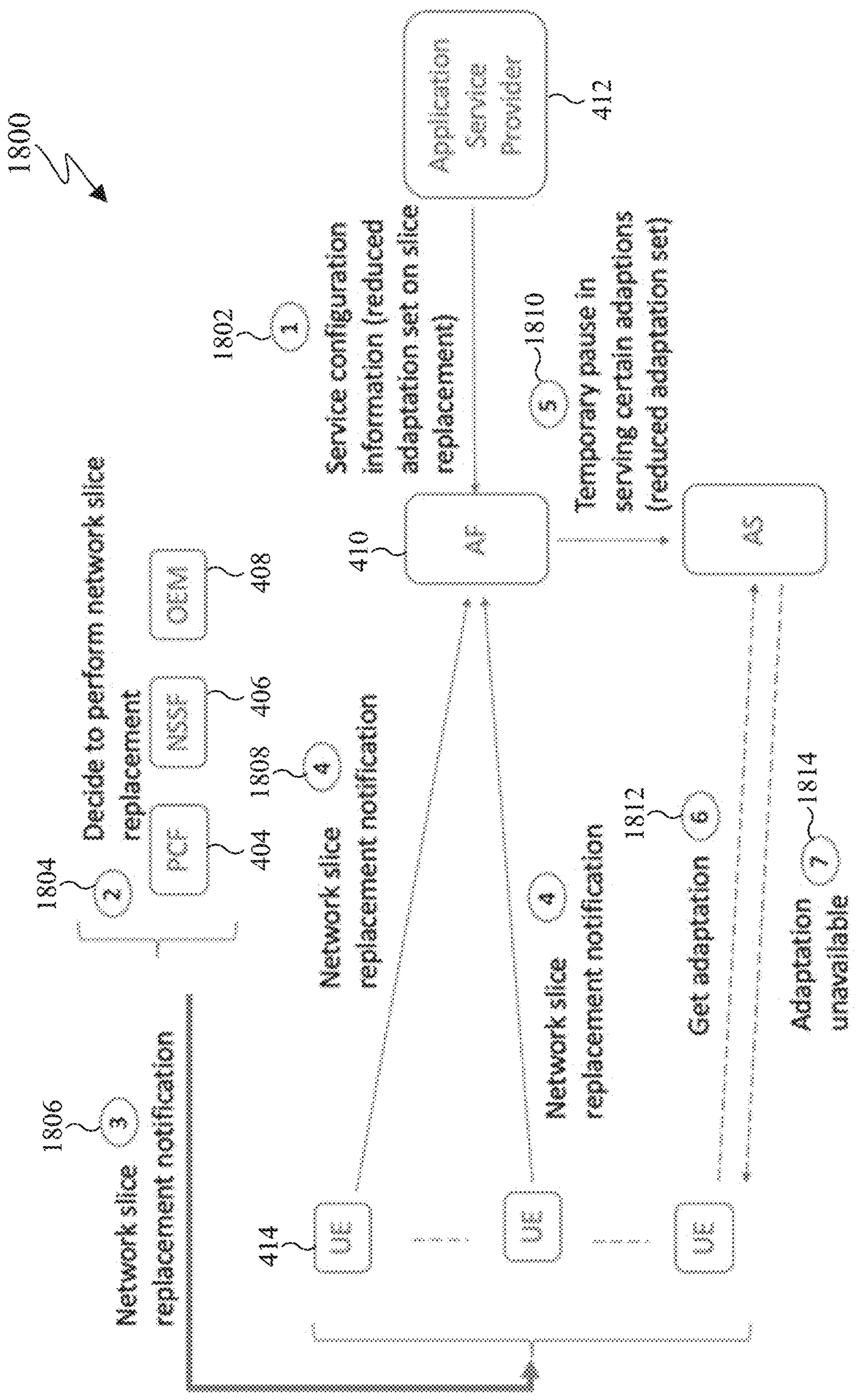
FIG. 18 illustrates an example system for avoiding network slice replacement by reducing available adaptations in accordance with this disclosure.

FIG. 18 illustrates an example system 1800 for avoiding network slice replacement by reducing available adaptations in accordance with this disclosure. The embodiment of the system 1800 illustrated in FIG. 18 is for illustration only. FIG. 18 does not limit the scope of this disclosure to any particular implementation of an electronic device.

As shown in FIG. 18, the ASP 412 may choose to reduce the number of adaptations for the media service during network slice replacement. For example, for a simple streaming service, if the media service is currently distributing content with bit rates (e.g., HD, 2K, 4K, 8K etc.), the ASP 412 may indicate to the AF 410 that during network slice replacement procedures, one or more of the content bit rates may be temporarily paused so users accessing other bit rate content get access to the content they are requesting in the same network slice 402. This process of limiting certain adaptations can be undertaken by the AF 410 if the new alternative network slice 402 that is replacing the primary network slice 402 is unable to provide similar performance guarantees of that of the primary network slice 402.

Because of temporary pause in delivery of certain adaptations, the UEs 414 accessing those adaptations may cease receiving their desired adaptations. As a result of this temporary pause, some UEs 414 may use adaptive bit rate techniques to switch to an adaptation that is continuing to be delivered i.e., available. However, some devices may choose to deny switching to available adaptations because of many reasons (unsupported form factor—e.g., low resolution devices declining to upgrade to a 4K stream; insufficient codec support etc.). Because of these reasons, user traffic delivered through the primary network slice 402 decreases, and a consequence of this could be that the network entities deem network slice 402 replacement procedures to be unnecessary anymore because of reduced demand.

The ASP 412 configures the list of all possible adaptation sets for the media service at step 1802. The ASP 412 also configures the list of adaptions to be dropped during network slice replacement procedures. The ASP 412 may use the M1 provisioning API described in TS 26501 and TS 26512 to configure this information at the AF 410.

Network entities decide to replace primary network slice 402 with an alternative network slice 402 as described in TS 23501 at step 1804. The network entities notify the UE 414 about network slice replacement as described earlier in the disclosure at step 1806. The UE 414 (or the MSH inside the UE 414 described in TS 26501 and TS 26512) inform the AF 410 about potential network slice replacement by the network entities at step 1808.

The AF 410 informs the AS (Application Server) to temporary pause the adaptions to be made available in the network slice 402 at step 1810. The AF 410 provides the list of adaptations to be dropped. The AS when it receives the list of adaptations to be dropped stops generating the indicated adaptations. The UEs 414 may request one or more adaptions at step 1812. For certain adaptations, the AS replies back with unavailable adaptation at step 1814. Certain UEs 414 may stop accessing the service. Other UEs 414 may switch to an available adaptation using ABR techniques.

Although FIG. 18 illustrates an example system 1800 for avoiding network slice replacement by reducing available adaptations, various changes may be made to FIG. 18. For example, the number and placement of various components of the system 1800 can vary as needed or desired. In addition, the system 1800 may be used in any other suitable multimedia process and is not limited to the specific processes described above.

Figure 19:
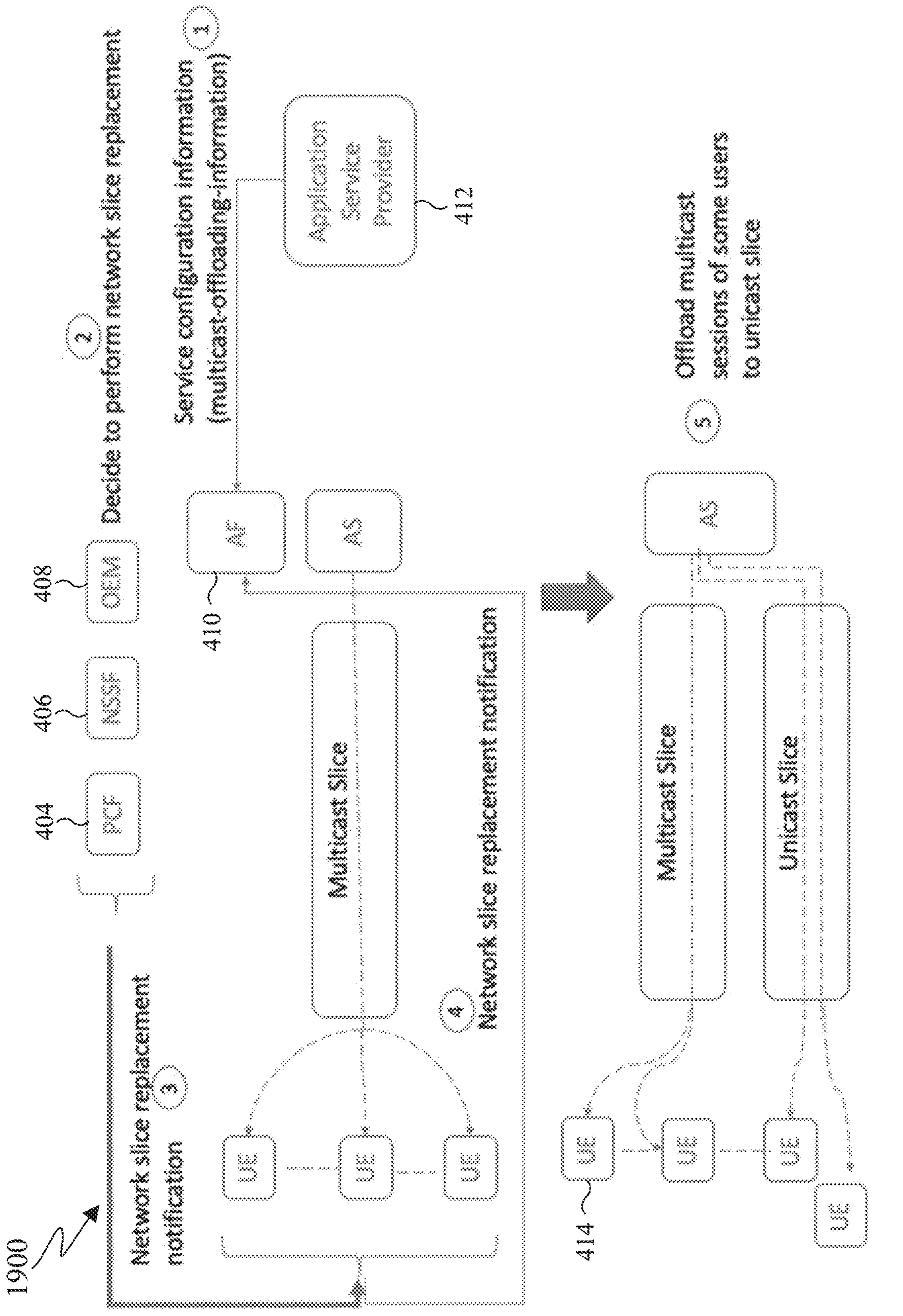
FIG. 19 illustrates an example system for offloading multicast sessions of some users during network slice replacement in accordance with this disclosure.

FIG. 19 illustrates an example system 1900 for offloading multicast sessions of some users during network slice replacement in accordance with this disclosure. The embodiment of the system 1900 illustrated in FIG. 19 is for illustration only. FIG. 19 does not limit the scope of this disclosure to any particular implementation of an electronic device.

The provisional application U.S. Prov. App. No. 63/543,997 filed on Oct. 13, 2023, Prosecution Id: WD-202310-028-1-USO, Title: Managing network slice Replacement with Application Layer Information, which is incorporated by reference in its entirety, describes methods for offloading certain user sessions from multicast so alternate network slice 402 with limited capabilities may be sufficient to offer multicast for remaining users. In this disclosure, the above method can be enhanced using service configuration information from the ASP 412.

To facilitate multicast user group reduction, the ASP 412 may configure an offload-multicast-user-list, a list of cells-Ids, a geographic area, a percentage-of-users-for-multicast-offloading, and a deliver-service-to-offloaded-users-using-unicast at the AF 410 (e.g., using the M1 provisioning API as specified in TS 26501 and TS 26512. The offload-multicast-user-list can include a list of users who may be removed from the multicast group during network slice replacement procedures so alternate network slice 402 may be enough for continuing multicast sessions. The list of cell-Ids can include a list of cell identifiers. All the users in the list of cell identifiers may be removed from the multicast membership. The geographic area can include all users in this area may be removed from the multicast membership. The percentage-of-users-for-multicast-offloading can include a percentage number of users whose membership in the multicast group is removed during network slice replacement procedures. The ASP 412 may provide further information for identification of users to be considered to see if they can be included in the given percentage of users. Form factor and end user capabilities of the user devices: For example, user devices with certain type of limitations or restrictions may be considered for removal—e.g., devices with limited resolutions. The subscription can include users with least subscription levels may be picked for removal. The deliver-service-to-offloaded-users-using-unicast can indicate whether the users that are removed from the multicast group are delivered service through unicast sessions.

As shown in FIG. 19, the offloading of certain multicast user sessions to unicast using ASP 412 configuration may happen. The ASP 412 configures the information for offloading certain multicast users to unicast at step 1902. The network entities decide to replace primary network slice 402 with an alternative network slice 402 as described in TS 23501 at step 1904. The network entities notify the UE 414 about network slice replacement as described earlier in the disclosure at step 1906. The UE 414 (or the MSH inside the UE 414 described in TS 26501 and TS 26512) inform the AF 410 about network slice replacement by the network entities at step 1908. The AF 410, based on information from the ASP 412 offloads certain user sessions from multicast to unicast as described in this disclosure so alternate network slice 402 is suitable for continuing multicast for other users at step 1910.

The ASP 412 may provide service configuration information to the 5GMS AF 410 to help with managing network slice replacement, which can be shown in Table 7.

TABLE 7

| Information Element | Description |
|---|---|
| Terminate-UE-sessions | Boolean variable indicating whether to terminate sessions of some UEs receiving media service to avoid network slice replacement |
| UE-terminate-list | List of UEs whose sessions are to be terminated as described earlier in the disclosure |

TABLE 7-continued

| Information Element | Description |
| --- | --- |
| Percentage-UE-termination | Indicates percentage of UEs, among all the UEs receiving service, whose session is to be terminated. When only given this service configuration information without the UE-terminate-list, AF selects the list of users, based on given percentage amount, whose sessions are to be terminated |
| Service-adaptation set | List of all adaptation sets that have to be delivered as part of this media service |
| Pause-adaptation-set | List of adaptation sets that may be dropped during network slice replacement procedures if there is an opportunity to avoid network slice replacement |
| Add-edge-computing | Boolean variable indicating whether the AF needs to add edge compute resources to satisfy the requirements of UEs so as not to go beyond the capabilities of the network slice. This helps in avoiding network replacement tasks. When AF receives this configuration option, AF watches for notification information from the UEs about possible network slice replacement. Upon receiving a notification, AF provisions edge compute resources so service requests from the UEs are addressed by the edge compute resources. An early deployment of edge computing resources may help in avoiding network slice replacement, and instead continue in the same primary network slice. |

Although FIG. 19 illustrates an example system 1900 for offloading multicast sessions of some users during network slice replacement, various changes may be made to FIG. 19. For example, the number and placement of various components of the system 1900 can vary as needed or desired. In addition, the system 1900 may be used in any other suitable multimedia process and is not limited to the specific processes described above.

Figure 20:
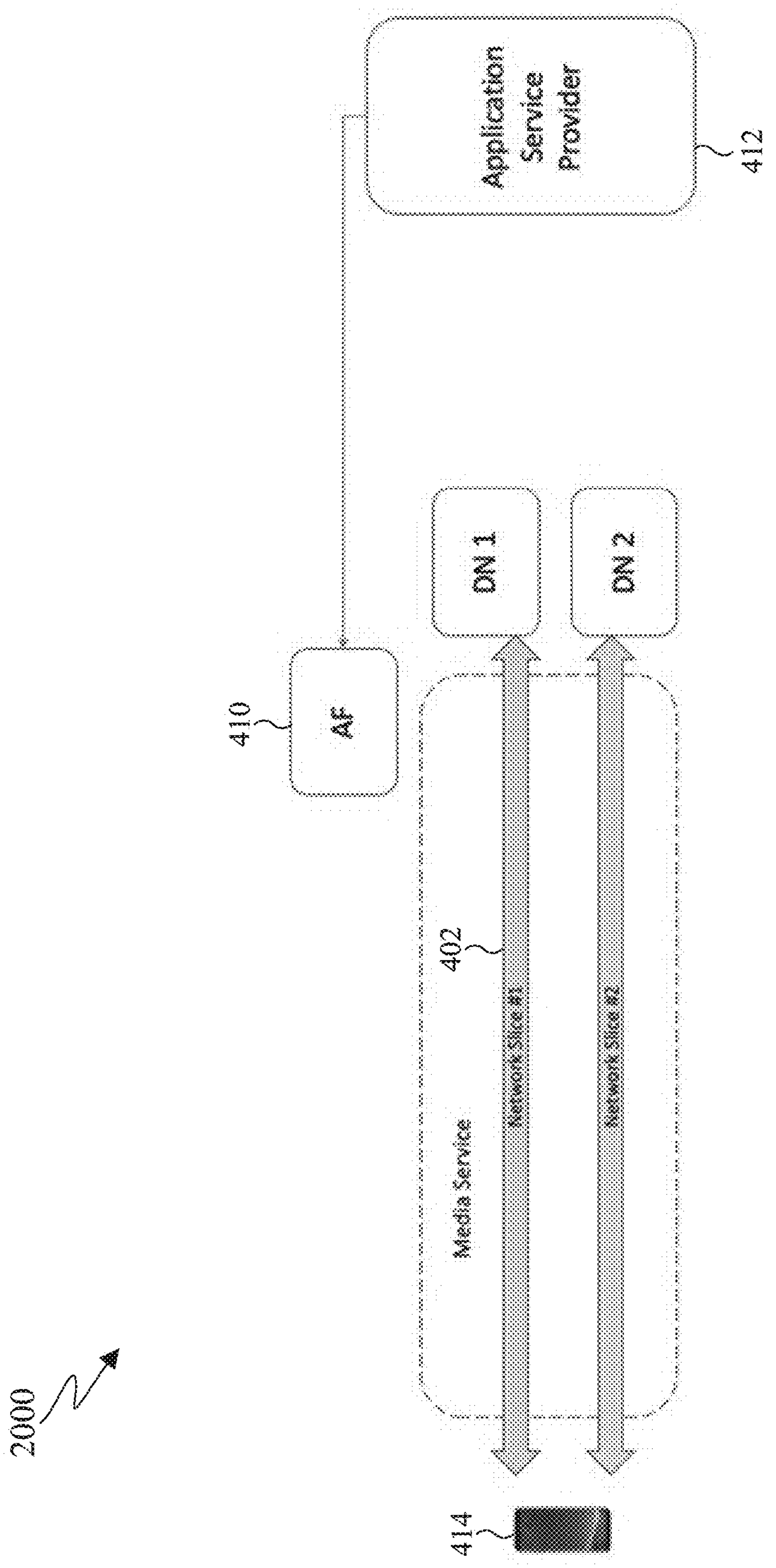
FIG. 20 illustrates an example system for network slice replacement with multiple network slices in accordance with this disclosure.

FIG. 20 illustrates an example system 2000 for network slice replacement with multiple network slices 402 in accordance with this disclosure. The embodiment of the system 2000 illustrated in FIG. 20 is for illustration only. FIG. 20 does not limit the scope of this disclosure to any particular implementation of an electronic device.

As shown in FIG. 20, when a media service is delivered to the end user using two or more network slices 402, and the network entities decide to replace one of those network slices 402, then necessary mechanisms have to be in place for managing application flows in both the network slices 402. Towards this, an ASP 412 may configure multiple service provisioning options to be useful during network slice replacement procedures e.g., using the M1 provisioning API described in TS 26501 and TS 26512. The options configured by the ASP 412 could be any of a replace-all-slices option, a migrate-flows-to-slices-within-the-service option, a provision-new-slice option, etc.

The replace-all-slices option, if one of the network slices 402 of the media service are being replaced by the network entities, indicates to the AF 410 that all the network slices 402 have to be replaced with alternate network slices 402 instead of just replacing one network slice 402. When the AF 410 receives this information, it configures this information in the PCF 404. When network entities decide to replace one network slice 402 with another network slice 402, then the network entities, with the help of PCF 404, replaces all network slices 402 in the media service.

The migrate-flows-to-slices within-the-service option, if one or more of the network slices 402 of the media service are being replaced by the network entities and if the alternate network slice 402 is unable to provide similar performance guarantees as the original primary network slice 402, indicates to the AF 410 that the application flows in the network slices 402 being replaced have to be migrated to other network slices 402 that are still part of the media service. For each network slice 402, ASP 412 may configure a map that shows which network slice 402 each of the application flow has to be migrated to in case network entities decide to replace the network slice 402. The network slice 402 to which the application flows are migrated to is in the set of network slices 402 provisioned for the media service usage. When the original network slice 402 that was replaced is back in operation, the above map helps in migrating the application flows back to the original network slice 402. As a result, the application flows are sent in network slices 402 that originally carried them before any network slice replacement procedures.

The provision-new-slice option, if a network slice 402 of the media service is being replaced by the network entities, indicates to the AF 410 that a new network slice 402 be provisioned by the network in case the alternate network slice 402 fails to provide similar performance guarantees. When this option is configured, and the network entities decide to replace a network slice 402, the network keeps checking to see if alternate network slice 402 provides similar performance guarantees. If performance is suffering, based on this option configured by the ASP 412, the network provisions a new network slice 402 until the original primary network slice 402 is back in operation.

Although FIG. 20 illustrates an example system 2000 for network slice replacement with multiple network slices 402, various changes may be made to FIG. 20. For example, the number and placement of various components of the system 2000 can vary as needed or desired. In addition, the system 2000 may be used in any other suitable multimedia process and is not limited to the specific processes described above.

Figure 21:
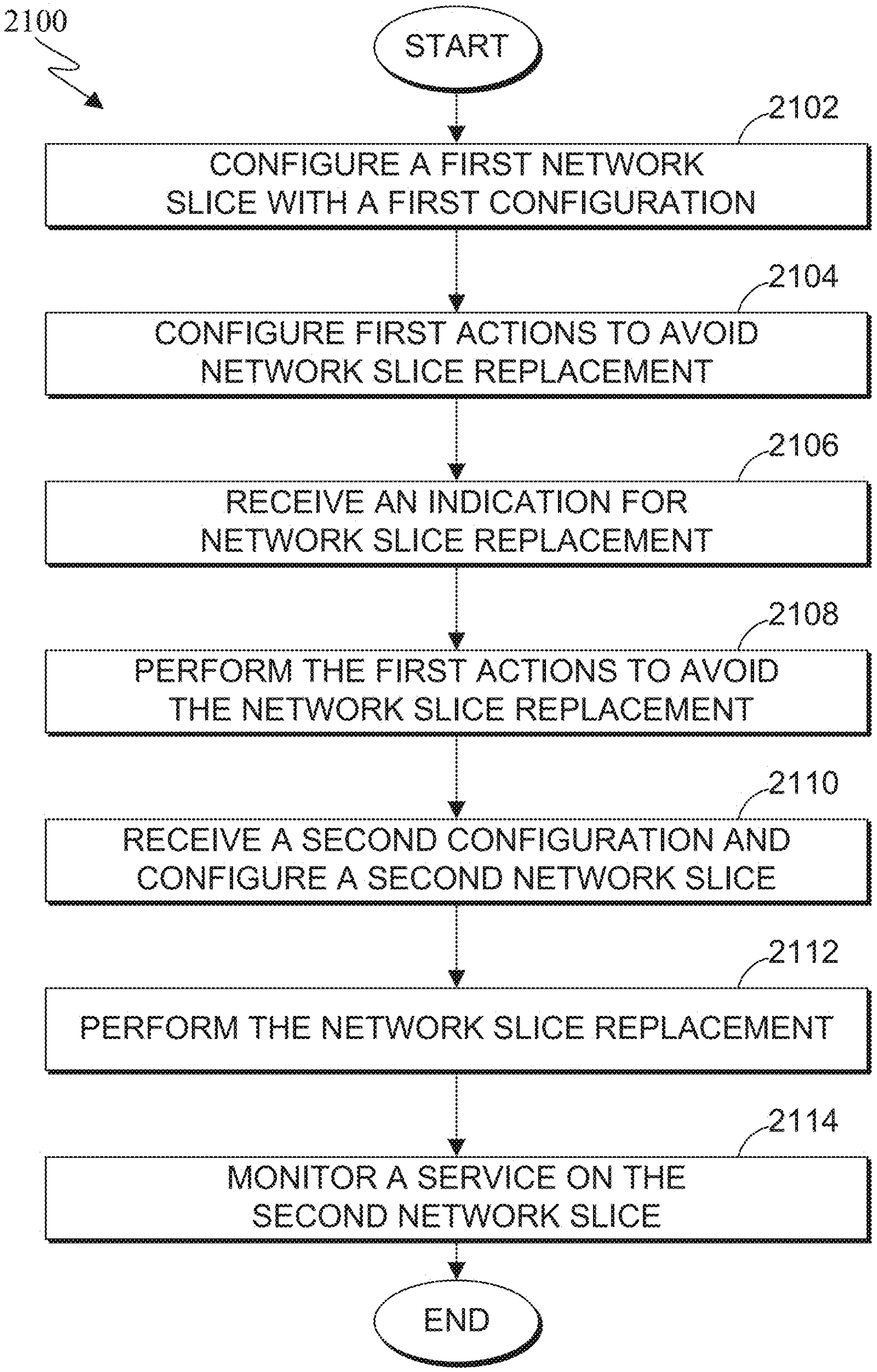
FIG. 21 illustrates an example method for network slice replacement for multimedia services according to this disclosure.

FIG. 21 illustrates an example method 2100 for network slice replacement for multimedia services according to this disclosure. For ease of explanation, the method 2100 of FIG. 21 is described as being performed using the electronic device 300 of FIG. 3. However, the method 2100 may be used with any other suitable system and any other suitable electronic device, including server 200 of FIG. 2 and the ASP 412 of FIGS. 4A through 5, 7 through 10, and 14 through 20.

As shown in FIG. 21, the electronic device 300 can configure a first network slice 402 with a first configuration at step 2102. Examples of properties for the configuration of the network slices 402 can be found above in Table 2.

The electronic device 300 can configure first action to avoid network slice replacement at step 2104. The first actions to avoid the network slice replacement can be configured based on feedback from a UE 414. The first actions to avoid the network slice replacement includes at least one of lowering availability of the service, reducing area of the service, increasing delay tolerance, lowering throughput per network slice 402, reducing support for group communication, reducing service adaptations, and reducing a number of supported UEs 414.

The electronic device 300 can receive an indication for network slice replacement at step 2106. The indication can be for immediately performing a network slice replacement or for performing a network slice replacement at a specified time. The electronic device 300 can perform the first action to avoid the network slice replacement at step 2108.

The electronic device 300 can receive a second configuration and configure a second network slice 402 at step 2110. The second network slice 402 can be configured based on the second configuration. Alternatively, the second configuration could be received prior to step 2102 and the second network slice 402 can be configured along with the first network slice 402 in step 2102. The second network slice 402 can have a minimum network slice configuration descriptor specified that provides absolute minimum values for parameters in the second configuration for the second network slice 402.

The electronic device 300 can perform the network slice replacement at step 2112. Once the network slice replacement is performed, the electronic device 300 can also perform second actions for ensuring the performance of the service on the second network slice 402. The second actions can include at least one of checking minimum service level agreements, determining drop off is above a threshold, and checking a minimum user count.

The electronic device 300 can monitor a service on the second network slice 402 at step 2114. The electronic device 300 can determine whether the service meets a minimum SLA and upon determining that the minimum SLA is not met, stopping or pausing the service.

Although FIG. 21 illustrates one example of a method 2100 for network slice replacement for multimedia services, various changes may be made to FIG. 21. For example, while shown as a series of steps, various steps in FIG. 21 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for managing network slice replacement in a communication system, the method comprising:

configuring a first network slice with a first configuration;

configuring first actions to avoid network slice replacement;

receiving an indication for the network slice replacement of the first network slice with a second network slice;

instructing to perform the first actions to avoid the network slice replacement;

when the first actions performed to avoid the network slice replacement are unsuccessful, moving application flows from the first network slice to the second network slice with a second configuration, the first configuration is different from the second configuration; and monitoring a service with the second network slice.

2. The method of claim 1, wherein the first actions to avoid the network slice replacement are configured based on feedback from a user equipment (UE).

3. The method of claim 1, wherein the first actions to avoid the network slice replacement includes at least one of lowering availability of the service, reducing area of the service, increasing delay tolerance, lowering throughput per network slice, reducing support for group communication, reducing service adaptations, and reducing a number of supported UEs.

4. The method of claim 1, wherein monitoring the service comprises:

determining whether the service meets a minimum service level agreement (SLA), and upon determining that the minimum SLA is not met, stopping or pausing the service.

5. The method of claim 1, further comprising:

prior to the indication for the network slice replacement, receiving the second configuration and configuring the second network slice with the second configuration.

6. The method of claim 1, further comprising:

after the indication for the network slice replacement, receiving the second configuration and configuring the second network slice with the second configuration.

7. The method of claim 1, further comprising:

specifying a minimum network slice configuration descriptor that provides absolute minimum values for parameters of the second network slice.

8. The method of claim 1, further comprising:

configuring second actions for ensuring performance of the service after the network slice replacement; and instructing to perform the second actions after the network slice replacement.

9. The method of claim 8, wherein the second actions for ensuring the performance of the service include at least one of checking minimum service level agreements, determining drop off is above a threshold, and checking a minimum user count.

10. The method of claim 1, wherein:

the indication includes a time for the network slice replacement, and instructing to perform the first actions comprises instructing to perform at least a portion of the first actions before the time for the network slice replacement.

11. An application function comprising:

a transceiver; and a processor configured to:

receive a configuration of a first network slice with a first configuration;

receive a configuration of first actions to avoid network slice replacement;

receive an indication for the network slice replacement of the first network slice with a second network slice;

instruct to perform the first actions to avoid the network slice replacement;

when the first actions performed to avoid the network slice replacement are unsuccessful, move application flows from the first network slice to the second network slice with a second configuration, the first configuration is different from the second configuration; and monitor a service with the second network slice.

12. The application function of claim 11, wherein the first actions to avoid the network slice replacement are configured based on feedback from a user equipment (UE).

13. The application function of claim 11, wherein the first actions to avoid the network slice replacement includes at least one of lowering availability of the service, reducing area of the service, increasing delay tolerance, lowering throughput per network slice, reducing support for group communication, reducing service adaptations, and reducing a number of supported UEs.

14. The application function of claim 11, wherein to monitor the service, the processor is configured to:

determine whether the service meets a minimum service level agreement (SLA), and upon determining that the minimum SLA is not met, stop or pause the service.

15. The application function of claim 11, wherein the processor is further configured to:

prior to the indication for the network slice replacement, receive the second configuration and configuring the second network slice with the second configuration.

16. The application function of claim 11, wherein the processor is further configured to:

after the indication for the network slice replacement, receive the second configuration and configuring the second network slice with the second configuration.

17. The application function of claim 11, wherein the processor is further configured to:

receive a minimum network slice configuration descriptor that provides absolute minimum values for parameters of the second network slice.

18. The application function of claim 11, wherein the processor is further configured to:

receive a configuration of second actions for ensuring performance of the service after the network slice replacement; and instruct to perform the second actions after the network slice replacement.

19. The application function of claim 18, wherein the second actions for ensuring the performance of the service include at least one of check minimum service level agreements, determine drop off is above a threshold, and check minimum user count.

20. The application function of claim 11, wherein:

the indication includes a time for the network slice replacement, to perform the first actions, the processor is configured to instruct to perform at least a portion of the first actions before the time for the network slice replacement.

* * * * *